(12) United States Patent
Ben-Kiki et al.

(10) Patent No.: US 11,575,737 B2
(45) Date of Patent: Feb. 7, 2023

(54) DYNAMIC INTERACTIVE NETWORK SYSTEM FOR PROVIDING ONLINE SERVICE AND SOCIAL COMMUNITY FOR ENGAGING, LEARNING, AND TRAINING SKILLS FOR MENTAL HEALTH

(71) Applicant: HAPPIFY, INC., New York, NY (US)

(72) Inventors: Tomer Ben-Kiki, New York, NY (US); Acacia Parks, Hiram, OH (US); Amy Jo Kim, Burlingame, CA (US)

(73) Assignee: Twill, Inc., New York, NY (US)

( * ) Notice: Subject to any disclaimer, the term of this patent is extended or adjusted under 35 U.S.C. 154(b) by 0 days.

(21) Appl. No.: 17/494,407

(22) Filed: Oct. 5, 2021

(65) Prior Publication Data
US 2022/0217199 A1    Jul. 7, 2022

Related U.S. Application Data

(63) Continuation of application No. 16/600,903, filed on Oct. 14, 2019, now abandoned, which is a
(Continued)

(51) Int. Cl.
*H04L 67/10* (2022.01)
*H04L 51/52* (2022.01)
(Continued)

(52) U.S. Cl.
CPC .............. *H04L 67/10* (2013.01); *G06Q 10/10* (2013.01); *G06Q 50/01* (2013.01); *H04L 51/52* (2022.05)

(58) Field of Classification Search
None
See application file for complete search history.

(56) References Cited

U.S. PATENT DOCUMENTS 5,435,324 A    7/1995    Brill
5,722,418 A    3/1998    Bro
(Continued)

FOREIGN PATENT DOCUMENTS

CN    101799849 A    8/2010
CN    102933136 A    2/2013
(Continued)

OTHER PUBLICATIONS

"Greenolive: an Open Platform for Wellness Management Ecosystem", by Zeng et al., 2010 (Year: 2010).
(Continued)

*Primary Examiner* — Schquita D Goodwin
*Assistant Examiner* — Jonathan A Sparks
(74) *Attorney, Agent, or Firm* — Bochner IP, PLLC; Andrew D. Bochner

(57) ABSTRACT

A dynamic interactive network system provides an online service and social community for engaging, learning, and training skills for happiness. The system includes a processor and memory storing instructions which when executed by the processor configure the processor to provide the online service. The instructions further configure the processor to provide tracks including activities, provide an initial happiness level and a track to a user based on a self-assessment completed by the user upon signing up, monitor progress of the user based on self-assessments periodically completed by the user, modify the track based on the self-assessments, suggest followers to the user from the users whose profiles match the profile of the user in terms of demographics, psychographics, and rating of the users on the online service, and generate a happiness graph for the user that correlates the activities and the followers with their impact on happiness level of the user.

29 Claims, 21 Drawing Sheets

Related U.S. Application Data continuation of application No. 14/284,229, filed on May 21, 2014, now abandoned.

(60) Provisional application No. 61/825,742, filed on May 21, 2013.

(51) Int. Cl.
*G06Q 50/00* (2012.01)
*G06Q 10/10* (2012.01)

(56) References Cited

U.S. PATENT DOCUMENTS

| | | |
|---|---|---|
| 6,293,904 B1 | 9/2001 | Blazey et al. |
| 6,728,679 B1 | 4/2004 | Strubbe et al. |
| 7,644,060 B2 | 1/2010 | Kadri |
| 8,577,671 B1 | 11/2013 | Barve et al. |
| 9,302,179 B1 | 4/2016 | Merzenich et al. |
| 2003/0059750 A1 | 3/2003 | Bindler et al. |
| 2003/0154212 A1* | 8/2003 | Schirmer ............ G06Q 10/107 |
| 2005/0228691 A1 | 10/2005 | Paparo |
| 2007/0143281 A1 | 6/2007 | Smirin et al. |
| 2009/0037470 A1 | 2/2009 | Schmidt |
| 2009/0119234 A1 | 5/2009 | Pinckney et al. |
| 2009/0171902 A1 | 7/2009 | MacLaurin et al. |
| 2010/0218118 A1 | 8/2010 | Bronkema |
| 2011/0125844 A1 | 5/2011 | Collier et al. |
| 2011/0183305 A1 | 7/2011 | Orbach |
| 2012/0095862 A1 | 4/2012 | Schiff et al. |
| 2012/0238800 A1 | 9/2012 | Naujokat et al. |
| 2012/0246102 A1 | 9/2012 | Sudharsan |
| 2012/0315613 A1 | 12/2012 | Shatte et al. |
| 2013/0101970 A1 | 4/2013 | Mascarenhas |
| 2013/0216989 A1 | 8/2013 | Cuthbert |
| 2014/0032234 A1 | 1/2014 | Anderson |
| 2014/0157171 A1 | 6/2014 | Brust et al. |
| 2014/0212853 A1 | 7/2014 | Divakaran et al. |
| 2014/0223462 A1 | 8/2014 | Aimone et al. |
| 2014/0274413 A1 | 9/2014 | Chelst |
| 2014/0276244 A1 | 9/2014 | Kamyar |
| 2014/0351332 A1 | 11/2014 | Ben-Kiki et al. |
| 2015/0140527 A1 | 5/2015 | Gilad-Barach et al. |
| 2015/0199010 A1 | 7/2015 | Coleman et al. |
| 2015/0297109 A1 | 10/2015 | Garten et al. |
| 2015/0339363 A1 | 11/2015 | Moldoveanu et al. |
| 2015/0348569 A1 | 12/2015 | Allam et al. |
| 2015/0351655 A1 | 12/2015 | Coleman |
| 2015/0371663 A1 | 12/2015 | Gustafson et al. |
| 2016/0055236 A1 | 2/2016 | Frank et al. |
| 2016/0203729 A1 | 7/2016 | Zilca |
| 2016/0350687 A1 | 12/2016 | Yamamoto et al. |
| 2017/0125008 A1 | 5/2017 | Maisonnier et al. |
| 2017/0169531 A1 | 6/2017 | Lycas |
| 2018/0260387 A1 | 9/2018 | Ben-Kiki et al. |
| 2018/0317840 A1 | 11/2018 | Ben-Kiki et al. |
| 2018/0344242 A1 | 12/2018 | Ben-Kiki et al. |

FOREIGN PATENT DOCUMENTS

| | | |
|---|---|---|
| CN | 103400054 A | 11/2013 |
| WO | WO-0122384 A1 | 3/2001 |
| WO | WO-2010144766 A1 | 12/2010 |
| WO | WO-2012094516 A1 | 7/2012 |
| WO | WO-2013059290 A1 | 4/2013 |

OTHER PUBLICATIONS

Beun et al., "Improving Adherence in Automated e-Coaching", International Conference on Persuasive Technology, Persuasive 2016: Persuasive Technology pp. 276-287. (Year: 2016).
Canadian Office Action dated Apr. 16, 2019 for corresponding Canadian Application 2,949,605 filed Nov. 18, 2016 (4 pages).
Canadian Office Action dated Apr. 30, 2020 for corresponding Canadian Application 2949605, filed Nov. 18, 2016 (9 pages).
Chinese Office Action dated Aug. 14, 2018 in corresponding Chinese Application 201480041214.1 filed Jan. 20, 2016 (5 pages).
Chinese Office Action dated Aug. 24, 2017 in corresponding Chinese Application 201480041214.1 filed Jan. 20, 2016 (7 pages).
Chinese Office Action dated Mar. 14, 2019 in corresponding Chinese Application 201480041214.1 filed Jan. 20, 2016 (10 pages).
Chinese Office Action dated Sep. 29, 2019 in corresponding Chinese Application 201480041214.1 filed Jan. 20, 2016 (8 pages).
Ciaramicoli, "What is Empathic CBT", <https://web.archive.org/web/20161014010605/http://www.balanceyoursuccess.com/what-is-empathic-cbt/> (Year: 2016).
European Examination Report for Application No. 14801490.5 dated Oct. 22, 2019.
European Search Report for Application No. 18835438.5 dated Mar. 15, 2021.
European Search Report for Application No. 18835919.4 dated Mar. 15, 2021.
International Preliminary Report on Patentability for International Application No. PCT/US2018/041603 dated Jan. 21, 2020.
International Preliminary Report on Patentability for International Application No. PCT/US2018/042272 dated Jan. 30, 2020.
International Search Report and Written Opinion for International Application No. PCT/US2019/036972 dated Sep. 23, 2019.
International Search Report and Written Opinion for International Application No. PCT/US2020/053820 dated Jan. 14, 2021.
International Search Report dated Nov. 6, 2014, that issued in the corresponding European Patent Application No. PCT/US2014/039022.
Mccallum, Simon "Gamification and serious games for personalized health". 2012. Publisher. Studies in health technology and informations. (Year: 2012).
The above foreign patent documents were cited in a Nov. 23, 2016 European Search Report, that issued in European Patent Application No. 14801490.5.
The above references were cited in a European Search Report dated Nov. 6, 2014, that issued in the corresponding European Patent Application No. PCT/US2014/039022.
The above references were cited the International Search Report of International Application No. PCT/US2018/041603 dated Nov. 8, 2018.
The above references were cited the International Search Report of International Application No. PCT/US2018/042272 dated Nov. 29, 2018.

* cited by examiner

FIG. 3B

DYNAMIC INTERACTIVE NETWORK SYSTEM FOR PROVIDING ONLINE SERVICE AND SOCIAL COMMUNITY FOR ENGAGING, LEARNING, AND TRAINING SKILLS FOR MENTAL HEALTH

CROSS-REFERENCE TO RELATED APPLICATIONS

This application is a continuation of U.S. Non-Provisional patent application Ser. No. 16/600,903, filed Oct. 14, 2019, entitled "Dynamic Interactive Network System For Providing Online Service And Social Community For Engaging, Learning, And Training Skills For Mental Health", which is a continuation of U.S. Non-Provisional patent application Ser. No. 14/284,229, filed May 21, 2014, entitled "Systems And Methods For Providing On-Line Services", which claims priority under 35 U.S.C. 119(e) to U.S. Provisional Patent Application No. 61/825,742, filed May 21, 2013, entitled "Systems And Methods For Providing On-Line Services." The entire contents the above-referenced applications are incorporated herein by reference.

INTRODUCTION

An exemplary embodiment comprises systems and methods for providing an on-line service referred to herein for convenience as "Happify." Happify is a science-based online service and social community for engaging, learning and training the skills of happiness. It may be offered through a variety of devices including PC, tablet and mobile.

In an exemplary embodiment, a Happify service is based on a framework developed by psychologists and researchers in the science of happiness (which includes positive psychology and neuroscience), and assists users in the development of certain happiness skills: e.g., Savor, Thank, Aspire, Give and Empathize (or S.T.A.G.E.™). Each skill may be developed using various activities, ordered in increasing skill level, that gradually unlock as the user progresses in building that skill.

In an exemplary embodiment, users who use Happify may be given a range of activities from the S.T.A.G.E. skills, from reflective blogging and science-based games and quizzes, to real-life tasks they are asked to perform and report back on. Each activity is backed by scientific studies that are directly accessible to the user.

An exemplary aspect may comprise a system and method for providing on-line services. The system and method comprise: a server for receiving information from a plurality of sources of data via a network, the plurality of sources of data comprising a plurality of attributes; a storage device for storing the information received from the plurality of sources of data; and a processor for tracking the plurality of sources of data. The processor determines attribute levels for each of the plurality of attributes and transmits updated information to the plurality of sources of data to increase the determined attribute levels.

In one or more exemplary system and method embodiments: (1) the plurality of attributes are based on human psychological happiness skills; and (2) the processor calculates a match score between at least two of the plurality of sources of data based on the determined attribute levels.

BRIEF DESCRIPTION OF THE DRAWINGS

FIGS. 3A and 3B depict sample activities.

DETAILED DESCRIPTION OF CERTAIN EXEMPLARY EMBODIMENTS

Figure 1:
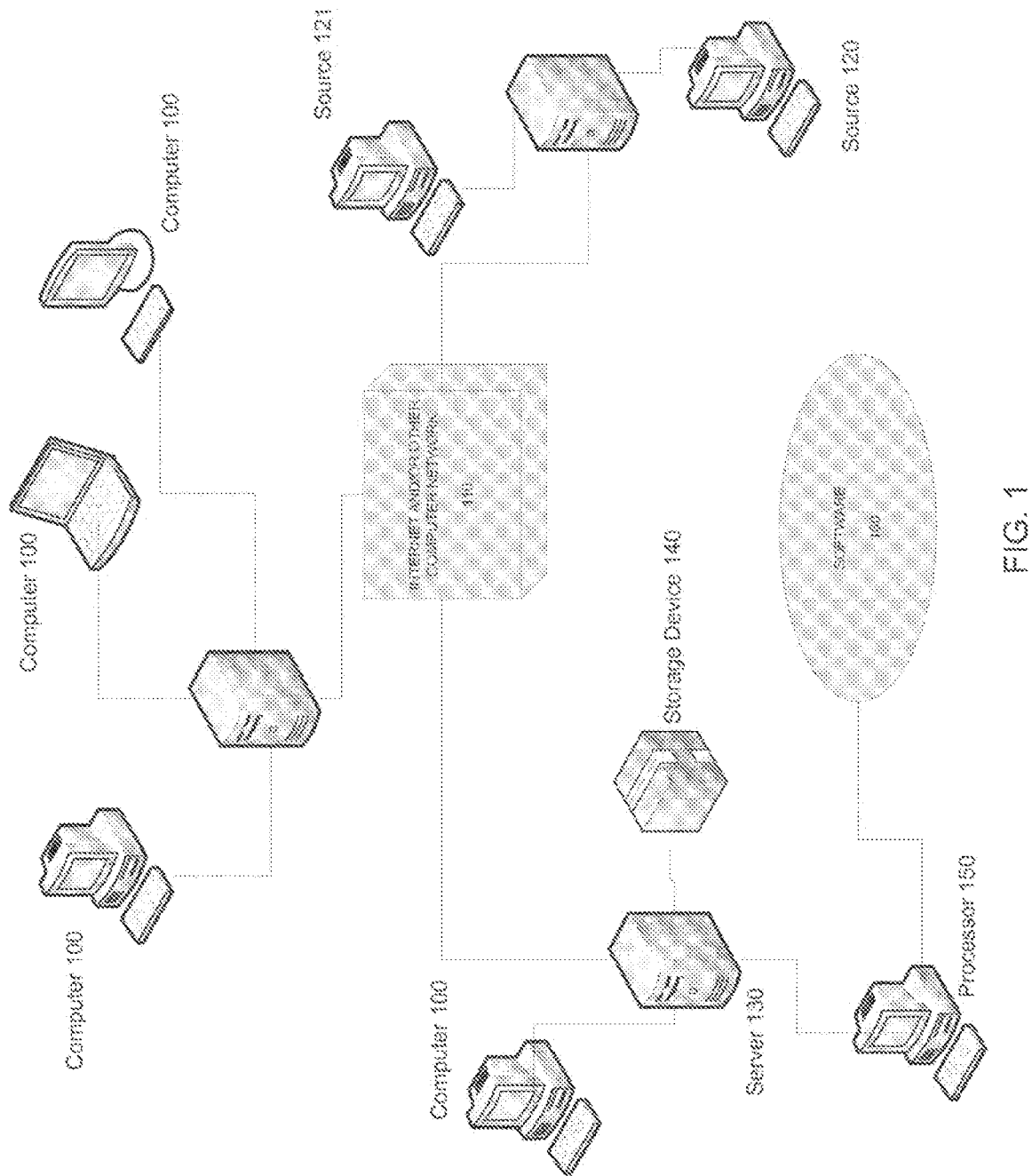
FIG. 1 depicts an exemplary embodiment comprising a computer system.

Happify is a science-based online service and social community for engaging, learning and training the skills of happiness. Happify activities may be offered to users in several ways. Two examples described below are "Tracks" and "Personal Recommendation and a la Carte."

Tracks: Tracks contain sets of activities programmed to address a specific life situation or goal ("Cope better with stress; "Enjoy parenting more", etc.) in, for example, a 4-week time period. Upon signing up, users may complete self-assessments that give them their initial happiness level as well as an initial recommended track. Users may complete approximately one part of a track each week, spanning 4 weeks altogether. When users finish a track part, they may win, for example, a badge that represents their level of activity in that track part.

Personal Recommendation and a la Carte: When not in a track, a user may be offered a personalized daily activity (an unlocked activity from a skill they haven't accessed in the past week). They also may pick activities from a skill menu and choose any unlocked activity of their choice.

As users perform their activities, they may create activity posts that are saved in their personal profile and build up a 'digital happiness wallet' they can reflect on. Posts may include the type of activity performed by the user, any text and images the user added, other people involved, if any, as well as the time and location for the post. Posts also may appear on various activity feeds on the service, which allows other users to read, draw inspiration from, and offer encouragement in the form of comments and likes.

Users may also follow activities posted by other users they find interesting if those users allow themselves to be followed or mark their post "public". Periodically, the service may make suggestions for users to follow other users whose profiles match in terms of demographics and psychographics, as well as level of activity on the site.

Users can keep track of their progress on Happify, thanks to periodic, scientifically-designed self-assessments that present them with their current happiness level compared to past levels.

Over time, Happify computer systems and software may build a 'Happiness Graph' for each user, consisting of activities, people, places and things correlated with the impact they had on the user's happiness levels. This information may be used to optimize the user experience and the activities the service suggests.

Happify is a science-based online service and social community for engaging, learning and training the skills of happiness. It is offered through a variety of devices including PC, tablet and mobile.

The service is based on a framework developed by psychologists and researchers in the science of happiness (which includes positive psychology and neuroscience), and consists of 5 essential happiness skills: Savor, Thank, Aspire, Give and Empathize (or S.T.A.G.E.™). Each skill contains various activities, ordered in increasing skill level, that gradually unlock as the user progresses in building that skill.

Users who join Happify are given a range of activities from the S.T.A.G.E. skills, from reflective blogging and science-based games and quizzes, to real-life tasks they are asked to perform and report back on. Each activity is backed by scientific studies that are directly accessible to the user.

Happify activities are offered to users in two ways:

Tracks: Tracks contain sets of activities programmed to address a specific life situation or goal ("Cope better with stress; "Enjoy parenting more", etc.) in a 4-week time period. Upon signing up, users complete self-assessments that give them their initial happiness level as well as an initial recommended track. Users complete approximately one part of a track each week, spanning 4 weeks altogether. When users finish a track part, they win a badge that represents their level of activity in that track part.

Personal Recommendation and a-la-carte: When not in a track, a user is offered a personalized daily activity (an unlocked activity from a skill they haven't accessed in the past week). They can also pick activities from a skill menu and choose any unlocked activity of their choice.

As users perform their activities, they create activity posts that are saved in their personal profile and build up a 'digital happiness wallet' they can reflect on. Posts include the type of activity performed by the user, any text and images the user added, other people involved, if any, as well as the time and location for the post. Posts also appear on various activity feeds on the service, which allows other users to read, draw inspiration from, and offer encouragement in the form of comments and likes.

Users can also follow activities posted by other users they find interesting if those users allow themselves to be followed or mark their post "public". Periodically, the service makes suggestions for users to follow other users whose profiles match in terms of demographics and psychographics, as well as level of activity on the site.

Users can keep track of their progress on Happify, thanks to periodic, scientifically-designed self-assessments that present them with their current happiness level compared to past levels.

Over time, Happify builds a 'Happiness Graph' for each user, consisting of activities, people, places and things correlated with the impact they had on the user's happiness levels. This information is used to optimize the user experience and the activities the service suggests.

Overview:
1. Framework: detailed description of the scientific framework, key concepts, features and algorithms for web and mobile product
2. Product Directory: list of activity types offered by the service
3. Web Spec: mocks and specifications of web product
4. Mobile Spec: mocks and specifications of mobile product
5. Science Reference: list of scientific studies being referred to by activities in the service
6. Creating a Happify track—Partners: guide used to inform partners on how to develop a Happify track
7. Follow suggestion: description of the algorithm used to recommend which users may be relevant for a user to follow
8. Activities: List of the key activities per skill by skill level. Does not include activities like games, quizzes and polls
9. Track recommendation survey: user questionnaire used to recommend the right tracks based on user's input. This questionnaire was developed by happiness researchers.
10. Happiness Assessment: user questionnaire used to establish their level of happiness, positive emotion and life satisfaction. This questionnaire was developed by happiness researchers and correlated with standard academy assessments. See Table 3, below, for the Happiness Assessment Questions and Calculations
11. Strengths Assessment: Self-assessment that determines the user's character strength profile
12. Skill Assessments: Set of questionnaires that determine the level of affinity and mastery for various skill categories for each of the STAGE™ skills Exemplary embodiments comprise computer components and computer-implemented steps that will be apparent to those skilled in the art. For example, calculations and communications can be performed electronically, and results can be displayed using a graphical user interface.

An exemplary such system is depicted in FIG. 1. Computers 100 communicate via network 110 with a server 130. A plurality of sources of data 120-121 relating to, for example, Happify user information, also communicate via network 110 with a server 130, processor 150, and/or other components operable to calculate and/or transmit, for example, user track and related information. The server 130 may be coupled to one or more storage devices 140, one or more processors 150, and software 160.

Other components and combinations of components may also be used to support processing data or other calculations described herein as will be evident to one of skill in the art. Server 130 may facilitate communication of data from a storage device 140 to and from processor(s) 150, and communications to computers 100. Processor 150 may optionally include or communicate with local or networked storage (not shown) which may be used to store temporary or other information. Software 160 can be installed locally at a computer 100, processor 150 and/or centrally supported for facilitating calculations and applications.

For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Moreover, where a computer system is described or claimed as having a processor for performing a particular function, it will be understood by those skilled in the art that such usage should not be interpreted to exclude systems where a single processor, for example, performs some or all of the tasks delegated to the various processors. That is, any combination of, or all of, the processors specified in the description and/or claims could be the same processor. All such combinations are within the scope of the invention.

Alternatively, or in combination, processing and decision-making may be performed by functionally equivalent circuits such as a digital signal processor circuit or an application specific integrated circuit.

Many routine program elements, such as initialization of loops and variables and the use of temporary variables, are not described in detail herein for brevity. Moreover, it will be appreciated by those of ordinary skill in the art that unless otherwise indicated, the particular sequence of steps described is illustrative only and can generally be varied without departing from the scope of the invention. Unless otherwise stated, the processes described herein are unordered—that is, the processes can be performed in any reasonable order.

All steps described herein will and should be understood by those skilled in the art as being capable of implementation by software, where feasible. Moreover, such software will be understood by those skilled in the art to be storable on a non-transitory computer readable medium and implementable by one or more computer processors.

Figure 2:
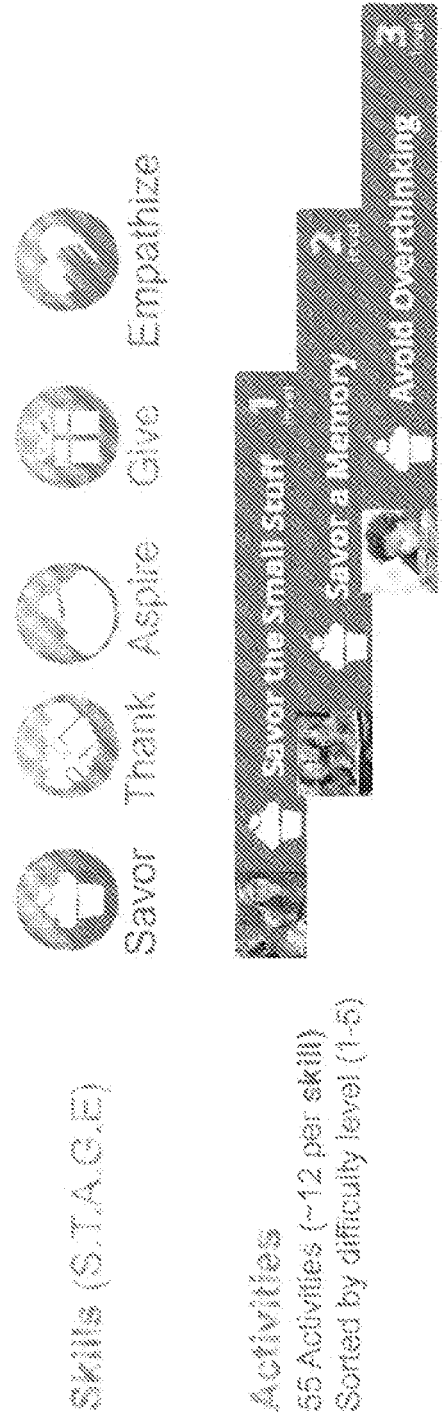
FIG. 2 depicts a hierarchy of skills, activities and tasks.
Figure 2:
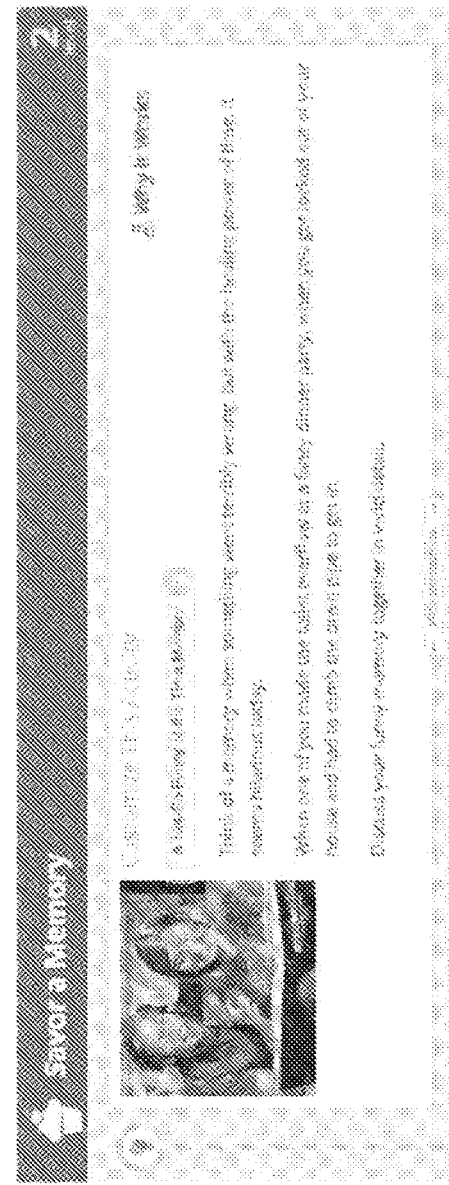

FIG. 2 depicts a hierarchy of skills, activities and tasks. According to an exemplary embodiment, skills comprise the following:

5 Core Happiness Skills (in Short: S.T.A.G.E.™)

| | |
|---|---|
| Savor | (savoring) |
| Thank | (gratitude) |
| Aspire | (optimism, meaning, hope) |
| Give | (kindness) |
| Empathize | (empathy) |

Framework was developed by leading happiness scientists. The STAGE framework captures the essence of the science of positive psychology (hundreds of studies) and allows for presentation to mainstream consumers in an accessible way.

Each STAGE skill is associated with a characteristic color and iconography to simplify and reinforce its identity.

Skill Levels:

Users interacting with the system start off at level-1 in all skills. As they complete activities they progress in each skill from level-1 to level-2 etc.

New activities, self assessments and other options unlock as the user reaches a higher level.

According to an exemplary embodiment, skills comprise the following:

For each skill, Happify offers relevant, science based activities that train the user in an entertaining way As the user levels up in a skill, they unlock new activities (Level 1 to level 5 activities are available in each skill)

Each activity provides the user with several alternatives for completing the activity ("Suggested Tasks") to pick from Users can view an explanation of "why it works": a short summary of the science behind that activity, complete with footnotes to the actual study this activity is based on.

Refer to "Happify Science Reference Studies" for the studies referred to from the activities.

Figure 3A:
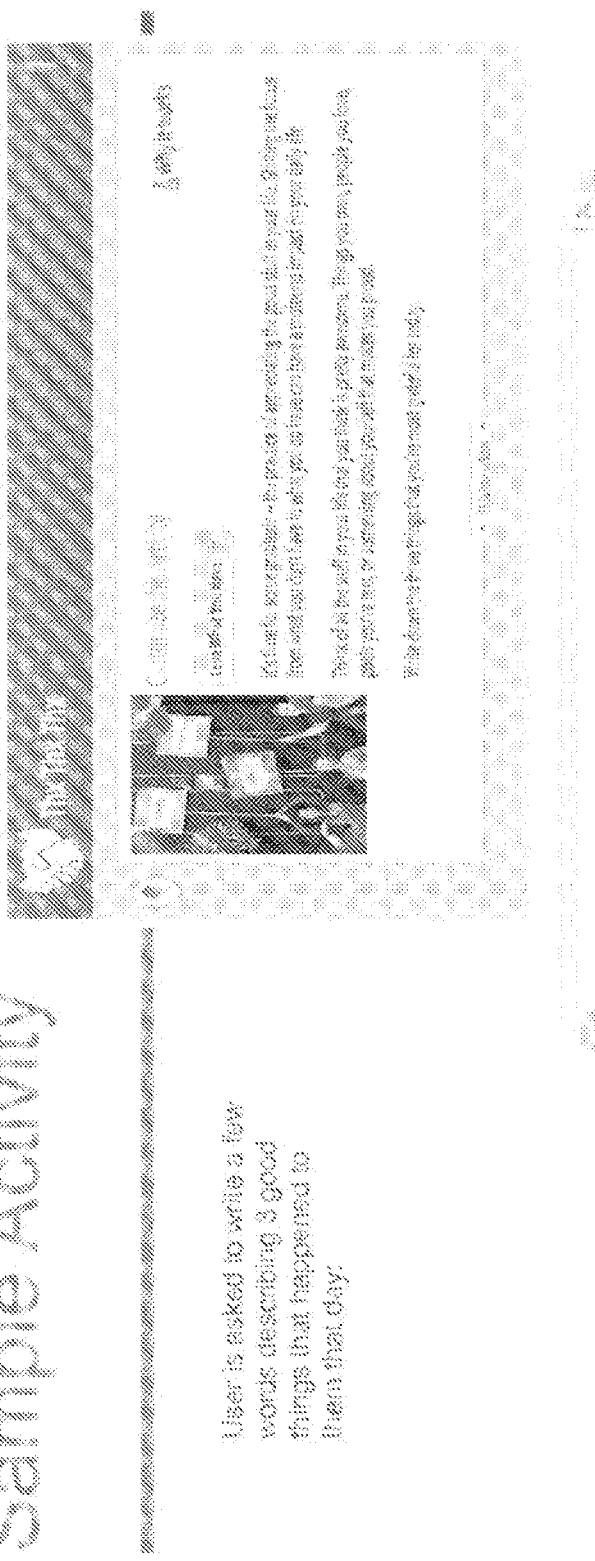

FIGS. 3A and 3B depict sample activities. Table 1 provides a list of exemplary activities:

TABLE 1

| Activity ID | Skill | Activity Type | Activity Name | Skill Level (1-5) | Activity Description |
|---|---|---|---|---|---|
| A-01 | Aspire | Essay | My victorious self | 1 | Imagine your life years and years in the future, assuming all has gone as well as possible. What would it look like? Write about it in as much depth as possible. Try and address every aspect of your life—personal and professional. |
| A-03 | Aspire | Essay | What's My Why? | 1 | From which activities in your life do you derive meaning? What is unique about those activities that makes them feel meaningful to you? |
| A-11 | Aspire | Essay | I'm looking forward to . . . | 1 | What upcoming events are you anticipating with joy and optimism instead of anxiety? Think of a future event, big or small, that you're really excited about. Imagine the details, including the sounds, smells, and tastes. Spend some time putting yourself right in the middle of it. |
| A-04 | Aspire | Plan-Do | I think I can | 2 | Set a relatively short-term goal (i.e. one that can be completed in the span of 1-2 wks). Imagine the benefits of achieving that goal. How will you feel? What will happen? |
| A-05 | Aspire | Essay | Find meaning in the mundane | 2 | Consider the broader meaning the seemingly non-meaningful activities (hobbies, chores, etc.) you engage in day to day-how do others benefit (directly, through your actions, or indirectly, through your improved mood) from you engaging in them? |
| A-02 | Aspire | Essay | My core values | 3 | Consider yourself at this point in your life. When at your best, what kind of a person are you? What positive traits do you associate with yourself? What positive traits would you like to work towards developing? |
| A-07 | Aspire | Essay | Pursue meaning | 3 | Take the essay you composed in A-02 and brainstorm some concrete ways to change your everyday life to better pursue the character ideals you identified as being most important to you. |
| A-06 | Aspire | Essay | Setbacks and steps forward | 4 | Think of a setback or negative experience you have had in the past (at least a year ago). Now, spend the next ten minutes writing about that event. What role did |

TABLE 1-continued

| Activity ID | Skill | Activity Type | Activity Name | Skill Level (1-5) | Activity Description |
|---|---|---|---|---|---|
| A-09 | Aspire | Plan-Do | Spend on what matters | 4 | that event have in shaping who you are today? Did anything good come of it? Spend some money to create a leisure experience that will be meaningful and rewarding for you (emphasize experiences, NOT material goods)—for example, if you are passionate about music, take a music class or go to a concert. |
| A-08 | Aspire | Plan-Do | Create meaning | 5 | Using what you've learned in previous activities, find ways to create meaning from boring tasks or everyday activities (ones that aren't particularly beneficial to anyone but you). The idea is to take something you already do and transform it into something meaningful. |
| A-10 | Aspire | Essay | I have a goal | 5 | Set a very long-term goal (i.e. one that can be completed in the span of several years). Imagine the benefits of achieving that goal. How will you feel? What will happen? |
| E-01 | Empathize | Essay | Give myself a break | 1 | Reflect on what it is like to be you. What makes you great? What challenges have you overcome? What accomplishments have you achieved? Create a narrative or "story" of your life thus far, highlighting the aspects that showcase your positive traits. |
| E-03 | Empathize | Essay | Whats my positive impact? | 1 | Keep a log of the nice things that you do for the people in your inner circle and/or at work. Use this information to draw some conclusions about the positive benefit that you have on those around you. |
| E-02 | Empathize | Essay | Walking in their shoes | 2 | Consider what it would be like to be someone very different from yourself, with whom you have very little interaction and of whom you have very little understanding. It may help to do some informal research on the web. |
| E-04 | Empathize | Essay | Weird..why'd they do it? | 2 | When someone in your inner circle behaves in ways that you do not understand, see if you can look at the context to better understand their behavior. |
| E-05 | Empathize | Plan-Do | Get to know someone | 3 | Consider something you can do in your spare time that will allow you to get to know someone very different from yourself and do it. |
| E-06 | Empathize | Essay | Empathize with a different viewpoint | 3 | Think of what it is like to be someone with whom you disagree about something somewhat minor. Why do they feel differently from you? |
| E-07 | Empathize | Essay | Not cool-why'd they do it? | 3 | When someone in your inner circle behaves in ways that hurts or upsets you, see if you can look at the context to better understand their behavior. |
| E-08 | Empathize | Essay | Empathize when you disagree | 4 | Think of what it is like to be someone with whom you disagree strongly about something of moderate important. Why do they feel differently from you? |
| E-10 | Empathize | Plan-Do | Help someone | 4 | Consider something you can do in your spare time that will allow you to improve the life of someone very different from yourself and do it. |
| E-11 | Empathize | Essay | How will s/he miss me? | 4 | Imagine what it would be like for one of your close others if you disappeared, or had never existed in the first place. In what ways would their lives be worse? What would they miss the most about you? |
| E-09 | Empathize | Essay | That hurt! What made them do it? | 5 | Reflect on a recent conflict you have had with someone and see if you can gain some insight into where they were coming from. Why were they at odds with you? What was their perspective? |
| E-12 | Empathize | Essay | Empathize when you're resentful | 5 | Think of what it is like to be someone (real, or hypothetical) with whom you vehemently disagree about something very important to you-about a political issue, for example. What challenges do they face? Why do they feel as they do? In your mind, try to treat this person with sympathy, understanding, and acceptance. |
| G-01 | Give | Plan-Do | Give a small gift | 1 | Spend a small amount of money on someone else-buy them a cup of coffee, or some cute little kitchy thing you saw in a store that reminded you of them, or a book you think they'd like. Ideally, it would be something that will spark some interaction with them (you can discuss the book, or chat while drinking the coffee). |
| G-03 | Give | Plan-Do | Make someone smile | 1 | What one nice thing did you do (or are you planning to do) for someone else today? Whether it's running an errand for a busy friend, baking cookies for a neighbor or mentoring a child, record it here. |

TABLE 1-continued

| Activity ID | Skill | Activity Type | Activity Name | Skill Level (1-5) | Activity Description |
|---|---|---|---|---|---|
| G-05 | Give | Plan-Do | Spend time on a valuable activity | 2 | Select a skill that is valuable to you or to someone you love, and invest an hour in developing it (for example, becoming better at playing an instrument, or learning to build coop for the chickens your spouse wants to buy, or practicing French so that you can go on that family vacation to France). |
| G-06 | Give | Plan-Do | Spend $$ on a shared experience | 3 | Select an activity that costs money, but is relatively inexpensive, and do that activity with someone in your inner circle on your dime. Alternatively, you can spend a small-moderate amount of money helping someone else. It can be someone you know, or a stranger-but be sure to stick around to see the other person benefit. |
| G-09 | Give | Plan-Do | Spend time with someone | 3 | Plan an excursion or activity with one or more members of your inner circle (friends, family, etc). It doesn't need to be expensive, but in your planning, emphasize new experiences and activities that will involve a lot of interaction with each other. |
| G-02 | Give | Do | One day, 5 nice things | 4 | Deliberately do five kind acts for someone else today. They can be big (helping a person cram for a midterm or prepare for a presentation at work) or small (putting coins in someone's nearly-expired meter or telling a stranger on the street that you like their dress). They can be planned or spontaneous, though since you must get five done in a single day, it helps to plan. They do not need to be for the same person, and they can be for people you know, or for strangers, or for some of both. Keep a log of the kind acts you do, including any kind acts you do in excess of the required five |
| G-07 | Give | Do | Celebrate someone's good news | 4 | Spend the week on the lookout for a victory, small or large, that one of your friends or coworkers experiences. Help them savor that victory using active-constructive responding: 1) ask lots of questions, 2) find a way to become genuinely excited about it, 3) help the person see implications of their victory that make it even better than they had realized, 4) prolong the positive emotion associated with the news by celebrating and telling other people about it. |
| G-08 | Give | Essay | Forgive an annoyance | 4 | Identify something that one or more close others in your life do that you often find yourself upset about. See if you can become more forgiving about that particular behavior-more understanding about why people do it, and more patient with people when they do it. |
| G-10 | Give | Essay | Forgive an offense | 5 | Identify something that someone else did that you hold a grudge about. Do a forgiveness exercise to see if you can let go of the grudge. |
| G-11 | Give | Plan-Do | Volunteer | 5 | Identify a cause that you care about and volunteer your time to furthering it in some tangible way. |
| G-12 | Give | Plan-Do | Donate $$ for a cause | 5 | Make a substantial charitable contribution. Do something that will allow you to directly witness the other person benefitting from your kind act. |
| S-01 | Savor | Plan-Do | Savor the small stuff | 1 | Consider a typical weekday. Review your morning routine, your daily activities, and your evening rituals, and consider how much time you spend noticing and enjoying the pleasures of the day, both small and large. Every day for the next week, be sure to savor at least two experiences (for example, your morning coffee, or the sun on your face as you walk to your car). Spend at least 2-3 minutes savoring each experience using the following techniques: 1. Sharing With Others: You can seek out others to share the experience and tell others how much you value the moment. This is probably the single best way to savor pleasure. 2. Memory-Building: Take mental photographs or even a physical souvenir of the event and reminisce about it later with others. 3. Self-Congratulation: Do not be afraid of pride. Tell yourself how impressed others are and remember how long you've waited for this to happen. 4. Sharpening Perceptions: Focus on certain elements and block out others. 5. Absorption: Let yourself get totally immersed and try not to think, just sense. |

TABLE 1-continued

| Activity ID | Skill | Activity Type | Activity Name | Skill Level (1-5) | Activity Description |
|---|---|---|---|---|---|
| S-02 | Savor | Do | Body scan meditation | 1 | Dedicate a chunk of time (anywhere between 10 minutes and an hour) to lie down, in silence, and systematically pay attention to each part of your body. Start by just focusing on your breathing for a minute or so. Then, starting with your feet, work your way through your calves, thighs, pelvis, stomach, back, chest, arms, hands, neck, face, and head, noticing any sensations in each place, and imagining that your breath is focused on that point. You can be more specific if you have more time-for example, you can stop at your ankles and knees on the way up your leg, and you can go through your low, mid, and upper back. There are various YouTube videos to guide you through a body scan, which you might use to get started. |
| S-03 | Savor | Plan-Do | Savor together | 2 | Using the skills you learned in Savoring Level 1, find an experience to savor that you can do together with other people. For example, you might go to a music performance, savor it while it is happening (you may need to walk them through the savoring techniques), and then discuss it afterwards. You could also savor a shared meal, a walk through a beautiful park, or a piece of good news you have received (go out and celebrate). |
| S-04 | Savor | Essay | Savor a memory | 2 | Think back on a positive event or experience you have had in your life and reminisce about it. Walk through that experience in your mind in as much detail as possible, using the savoring skills you learned in Level 1 to re-experience every aspect of the memory, including your emotional reactions at the time and the emotional reactions you are having now as you imagine it. |
| S-05 | Savor | Do | Avoid over-thinking | 3 | Create a plan to distract yourself or re-focus yourself on the task at hand whenever your mind starts to wander into over-analyzing your experiences. It can be anything from a mantra ("what is happening right now?") to a game you play, a poem you recite to yourself, or a rubber band you wear on your wrist and snap every time you catch yourself getting lost in worries. Anything that will help you to "reset" your brain and derail overthinking. |
| S-06 | Savor | Do | Basic meditation | 3 | Sit still, in a comfortable position, and just breathe. Pay attention to your breathing-to the rise and fall of your chest, or to the air tickling your upper lip as it comes out of your nose, or to any other sensation you experience as a result of breathing. See if you can keep your attention on your breathing, even as thoughts or feelings arise that distract you. You are very likely to experience thoughts such as "This isn't working," or "I am not doing it right." You may also have thoughts about other things you feel you should be doing. Acknowledge the thoughts and return to your breathing. Set a timer so that you do not need to check your clock-start with 5 minutes every day, and work your way up to 30. |
| S-07 | Savor | Plan-Do | Moving meditation | 3 | Choose a low-energy physical routine, such as yoga or gentle stretching, that takes about 20 minutes to complete. Ideally, it should be something you do not have to think about too much. As you go through each pose or stretch, pay close attention to the effect it has on your body. Hold the stretch, focusing your attention on every place where you feel something in your body, one place at a time. What is the sensation like? Repeat this for each pose. |
| S-08 | Savor | Plan-Do | All-day savoring | 4 | Deliberately arrange a day of leisure. Fill your day with different types of activities to savor-food, or music, or a beautiful walk, or a visit to a museum-and savor each of them in turn using |

TABLE 1-continued

| Activity ID | Skill | Activity Type | Activity Name | Skill Level (1-5) | Activity Description |
|---|---|---|---|---|---|
| S-09 | Savor | Essay | Reframe negative thoughts | 4 | the techniques you have learned in previous levels. Each day, write down at least one unpleasant thing that happened to you. Spend some time exploring why you think it happened. Once you come up with an explanation that you are fairly confident about, see if you can come up with other explanations. What are all of the possible reasons why what happened happened? Once you have a list of at least 3 possibilities (the bigger the better), read through each of them. Which seems most plausible to you? Which seems least plausible? What evidence do you have in favor of and against each possibility? When this is done, go back to your original explanation. How sure do you feel about it now? |
| S-10 | Savor | Plan-Do | Walking meditation | 4 | Choose a place to spend about 30 minutes walking. Ideally, it should be a place with many things to notice-scenery, activity, or both (a park is a great choice). Walk around, slowly at first, with your eyes looking down at the ground. Notice all of the tactile sensations associated with walking: the feeling of your feet on the ground, the temperature of the air as it stirs from your motion, the way your body feels at each stage of each step, and so on. Continue to do this until you are able to walk at a normal pace while still paying attention to everything sensory that is happening to you. Once you have achieved this, begin paying attention to the sounds around you. Try not to think too much about what is happening; just notice. When you are able to continue attending to both your tactile and auditory sensations, begin looking around you, taking in the sights, noticing any activity around you. If, at any point, you lose track of your tactile sensations, go back to looking at the ground until you are focused again, then build back up to noticing everything around you. |
| S-11 | Savor | Plan-Do | Organize a savoring event | 5 | Decide on something to savor with a large group of people—a church group, or all of your coworkers, for example. Examples might include a community wine tasting or a class trip to a garden. Instruct the group on how to savor the experience using what you have used from practicing Social Savoring. |
| S-12 | Savor | Essay/Do | Living in the moment | 5 | Catch yourself when you are in the midst of an unpleasant experience. It can be an emotional state (being stressed) or an activity (like waiting in line, being at a frustrating meeting, having an unpleasant conversation, etc). Notice everything you can about what is happening to you internally: your physical sensations, your thoughts, your feelings. Do your best not to evaluate your experience (whether it is ok to feel what you are feeling, whether you are thinking rationally, etc). Just experience it. Afterwards, see what you can write down about what happened to you. Look at each aspect of the experience (physical, thought, and emotional) and see if you can see some ways that your physical sensations, thoughts, and feelings interacted with each other. |
| T-04 | Thank | Essay | Thx Thx Thx | 1 | Each night before bed, write down three things that happened THAT DAY that you are grateful for in 2-3 sentences. Also complete a rating of how good the day was, and of how difficult it was to come up with three good things. Track how those two ratings change over time. |
| T-09 | Thank | Essay | Today's grateful moment | 1 | Think of something, great or small, that you feel grateful for and describe it in a few words. |
| T-01 | Thank | Essay | Weekly Gratitude check-in | 2 | Once a week, write down a list of everything in your life for which you are grateful. Keep a record of your entries so that you can review them periodically. Look for themes in the types of things you often say you are grateful. |
| T-02 | Thank | Plan-Do | A week's worth of thanks (about a person) | 2 | Pick someone in your social "inner circle" and keep a gratitude log. Write down everything they do that you are grateful for for a fixed period of time (we recommend a month), then, at the end of |

TABLE 1-continued

| Activity ID | Activity Skill | Activity Type | Activity Name | Skill Level (1-5) | Activity Description |
|---|---|---|---|---|---|
| | | | | | that period, review the log. Are there any patterns in what this person tends to do that you are grateful for? What generalizations can you draw about who this person is and what they mean to you? |
| T-03 | Thank | Plan-Do | Deliver a week's worth of thanks | 3 | Show your gratitude log to the person you wrote it about, in effect giving them a "gratitude report." You can make this a regular practice, reporting in periodically. |
| T-05 | Thank | Essay | What am I proud of? | 3 | Each time you do something that makes you proud of yourself, write it down for an entire month. At the end of each month, review the log. What types of activities do you seem to value and take pride in? |
| T-06 | Thank | Do | Thank you note | 4 | Pick some individual to whom you are grateful, but who you have never properly thanked. Your gratitude could be for a particular time when they assisted you, or it could be very general (or both). It can be someone you see all the time, or someone you haven't seen in a while; it can be someone with whom you have an ongoing relationship, or someone who you do not know very well, or someone with whom you have a strained relationship. As long as you are very grateful to that person, they are a good candidate for this activity. Now, write a letter detailing your gratitude to that person-at least one page, but longer, if possible. Reflect, in as much detail as possible, on why you feel gratitude towards them. |
| T-08 | Thank | Plan-Do | I'm thankful, let's talk! | 4 | Discuss something or someone for which/whom you are very grateful with someone else who shares that gratitude. It may help if you have written a gratitude letter about the target of the discussion, and can share it with the other person to spark the discussion. |
| T-07 | Thank | Do/Plan-Do | Deliver a thank you note | 5 | Deliver the gratitude letter you wrote in level 3 to the person for whom it was intended. |

Figure 4:
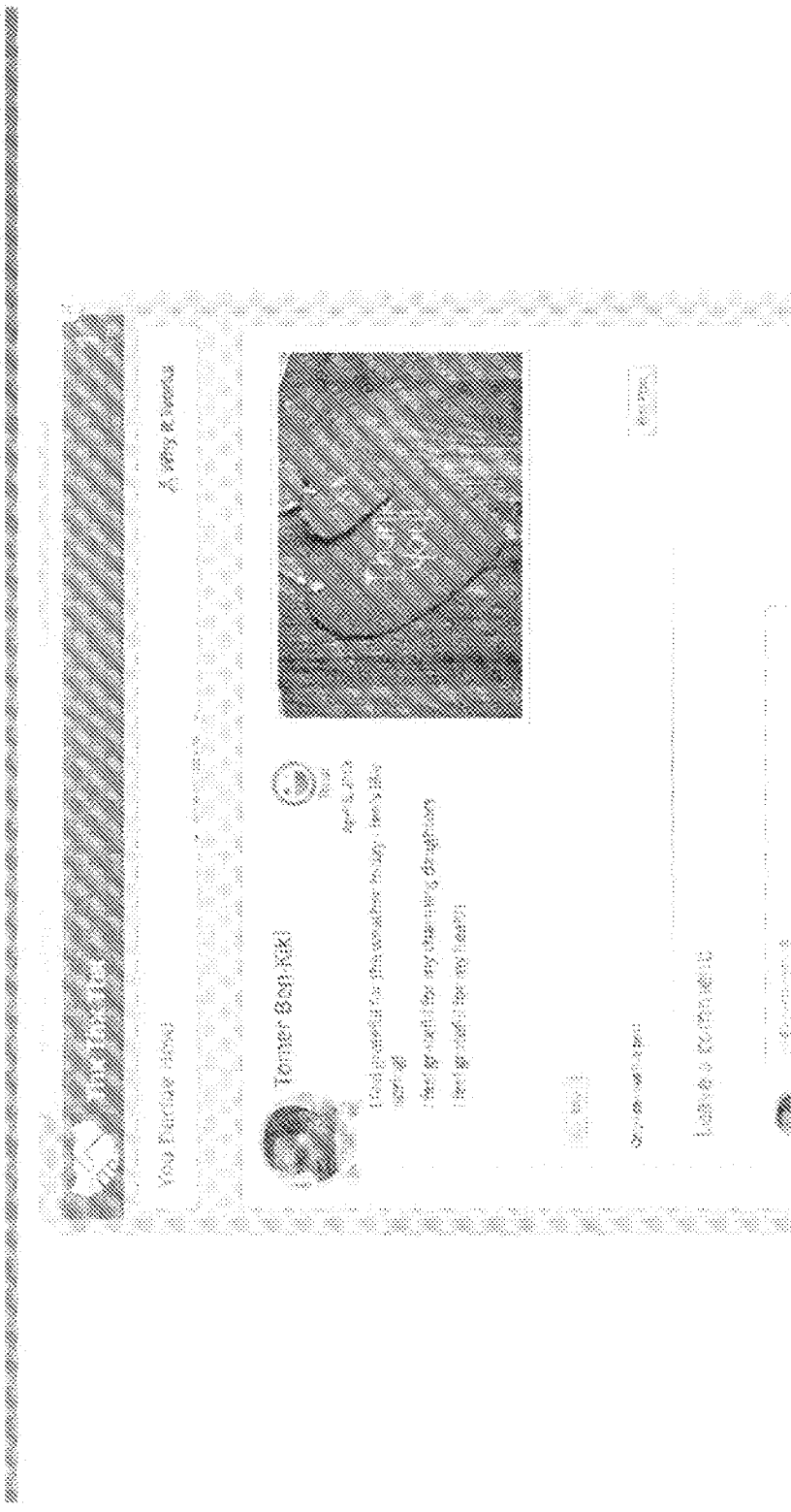
FIG. 4 depicts an activity post.

FIG. 4 depicts an activity post. Every activity a user completes creates a post that is added to the user's profile. Users can mark their posts private (only visible to them) or viewable to other people (people who follow them and people doing the track in group mode with them—see slide 10 for tracks). Users can like and comment on posts to encourage each other and discuss their contents.

The framework offers different types of science-based activities to users. The following provides a sample list, with the complete list provided in the product directory:

Reflective Micro Blogging
 The user is asked to reflect on a topic and write down their thoughts (e.g. what they are grateful for, what they look forward to, taking another person's perspective etc.)

"Plan-Do"
 The user is asked to perform an activity in real life and write about his/her experience (e.g. do a savoring exercise)

Figure 5A:
FIGS. 5A-5C depict schematics for starting a track.
Figure 5B:
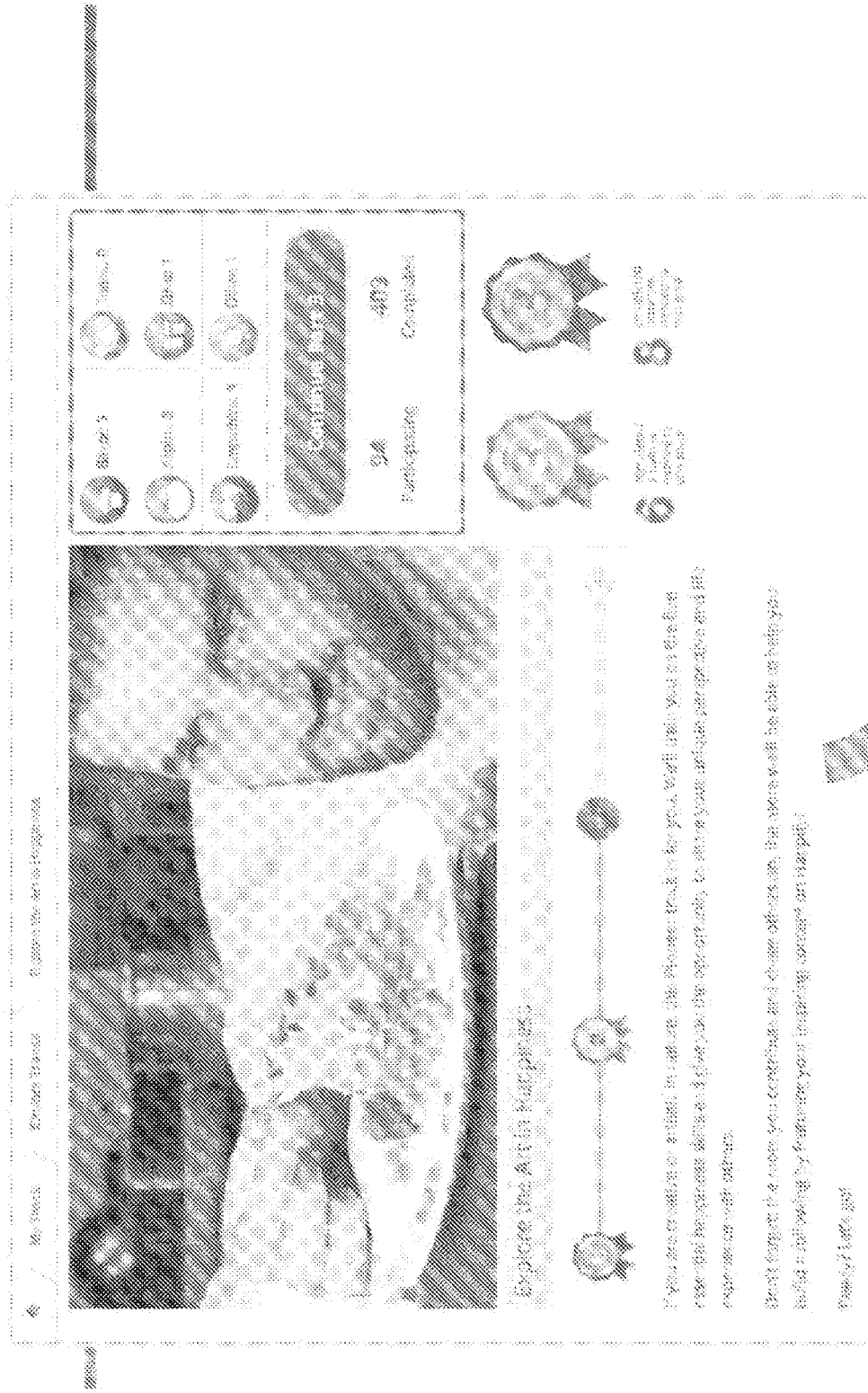
Figure 5C:
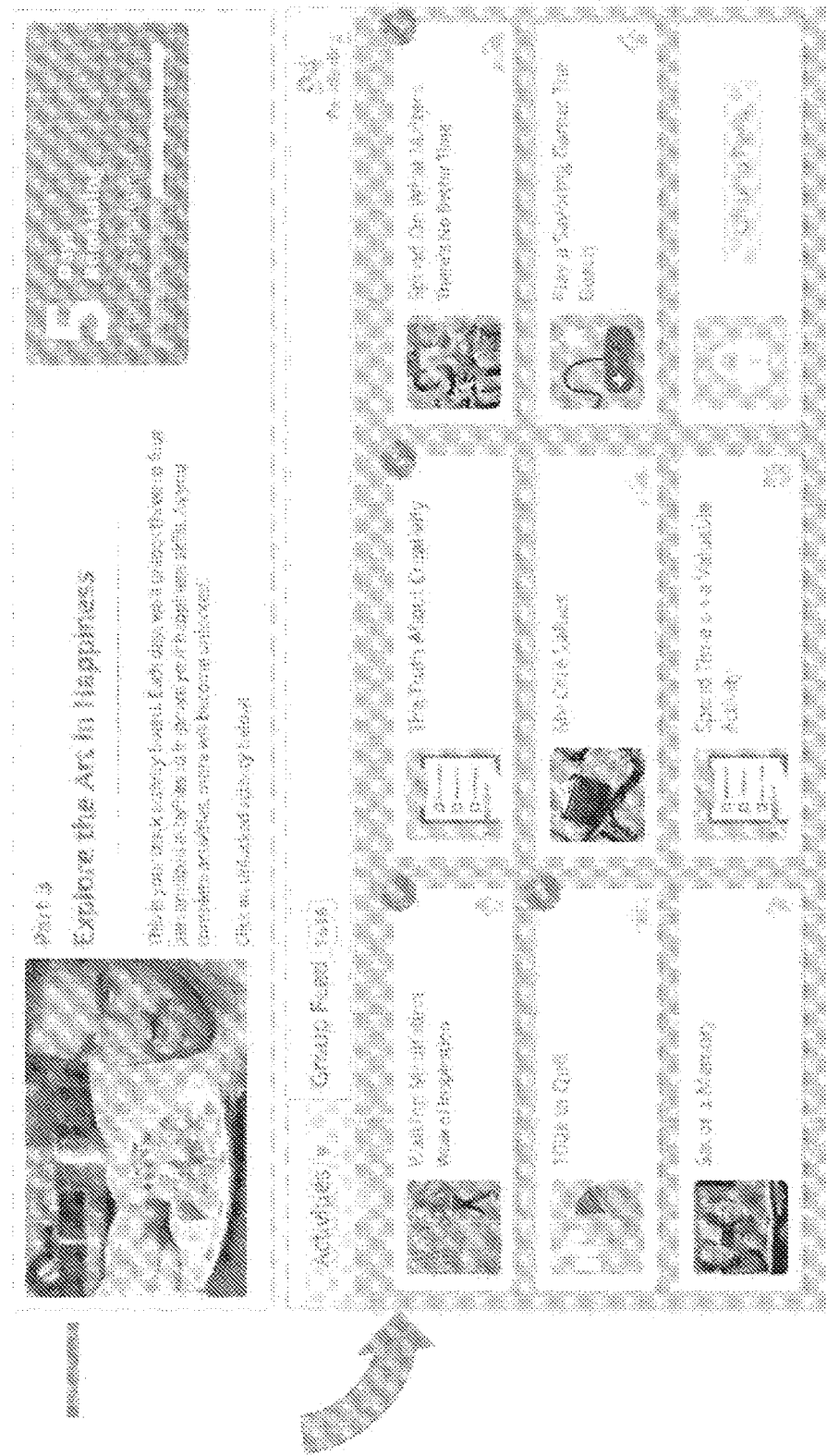

Quizzes
 Multiple choice questions and answers around the relevant track domain and the science of happiness Polls
 Polling the user's opinion about a related topic and showing them the community's vote breakdown Games
 Mini games training the user on a specific happiness skill FIGS. 5A-5C depict schematics for starting a track. Tracks are sets of activities that are programmed together to address specific life situations or concerns that users have. Each track is composed of 4 parts. The number of activities and their level of difficulty increases as the user progresses from part 1 to parts 2, 3, and 4.

Track Rules
 Users have approximately one week to complete a track part and thus earn badges (regular/honors badge, depending on the number of activities they completed.
 Users are allowed to extend beyond a week and still win the regular badge.
 If a user reaches the regular badge threshold they are allowed to 'win' it and move to the next part, or continue for the honors badge. This allows them to skip the remaining activities and win the regular badge if they prefer.
 Track activities can be 'time-locked', 'queue-locked', or available. At start, 2 activities are available for the user to perform, and one is 'queue-locked'—which means that if the user performs an available activity, it will make the 'queue-locked' activity become available.
 Each day, 3 time-locked activities become 'queue-locked', and queue-locked activities become available up to a limit of 4 available activities. This 4 limit is intended to avoid showing the user too many available activities when they next log in.

Social Interaction
 Users can view the shared posts of other people who are doing the track and like/comment on them or follow the authors of those posts.

Figure 6:
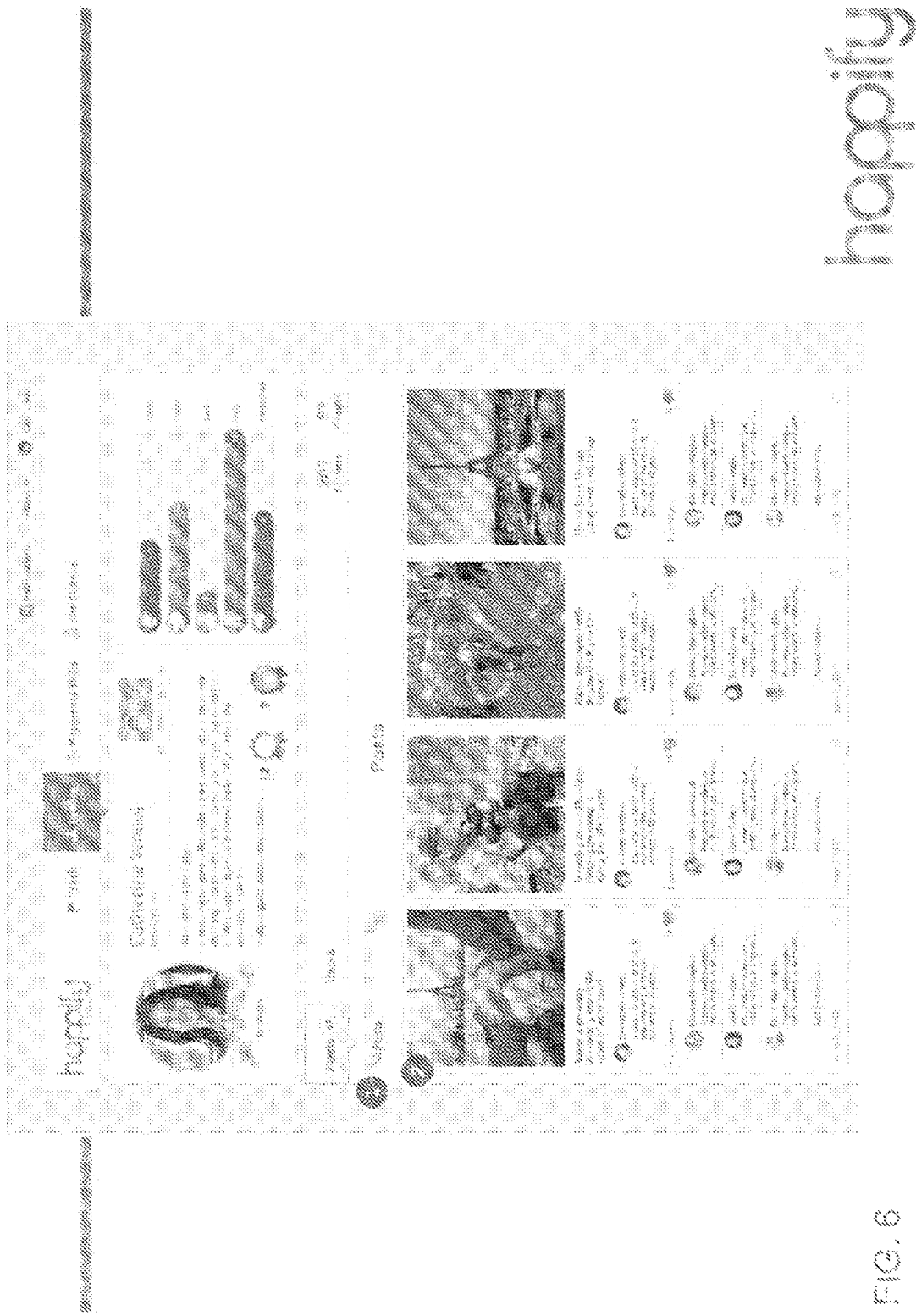
FIG. 6 depicts an example of a user's profile and posts.
Figure 7:
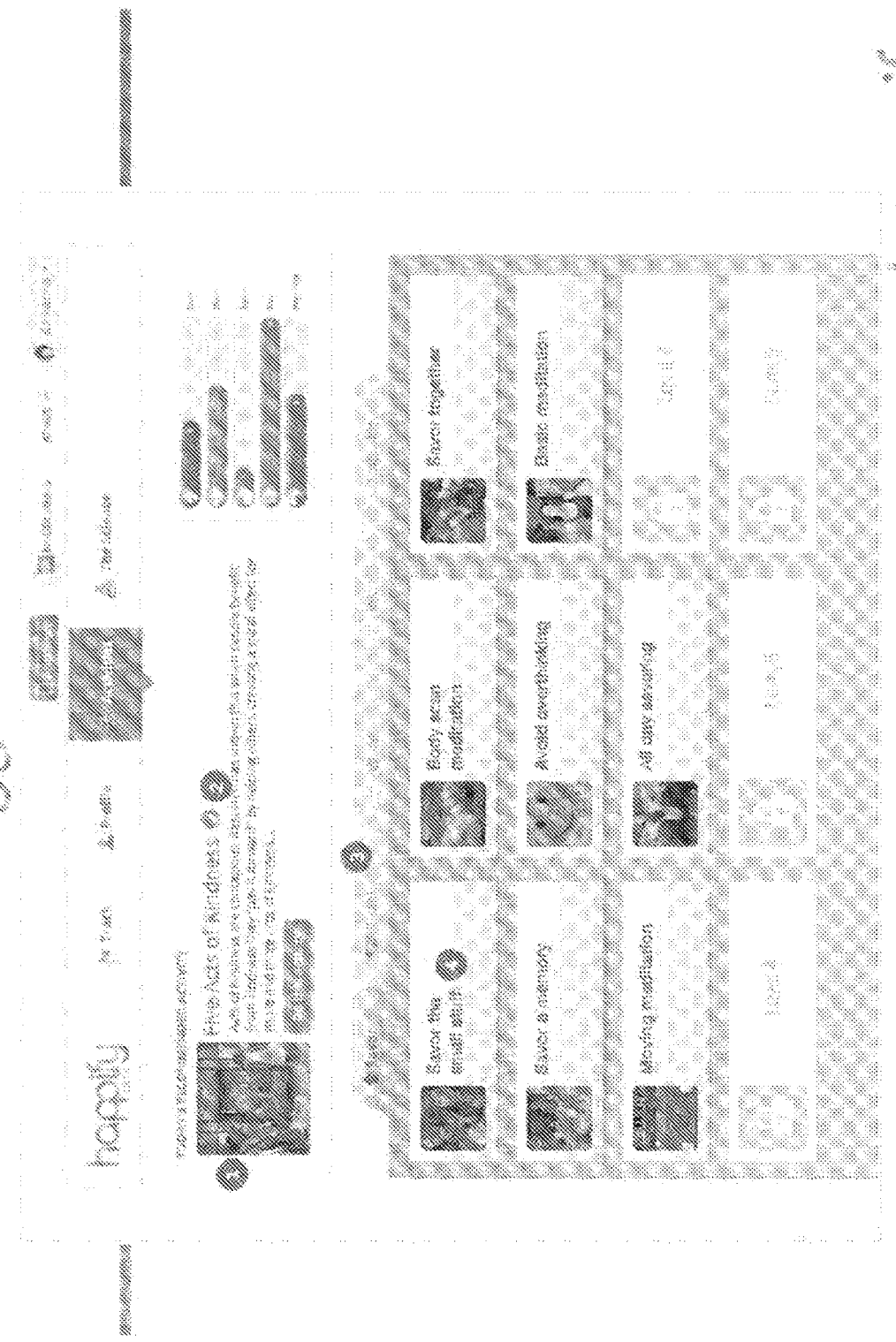
FIG. 7 depicts an example of personalized suggested activities.

Premium and Expert Tracks
 Happify offers special tracks created by experts and thought leaders in the field of emotional well-being and happiness science as Premium Tracks.
 The following provides a sample list of tracks:

Career And Money
 Appreciate what I have (currently available)
 Reduce on-the-job stress
 Get energized about my job
 Stay upbeat while out of work Balance work and home life
Control my spending habits
Family and Kids
  Enjoy parenting more (currently available)
  Better cope with new parenthood
  Better adjust to becoming an empty nester
  Forgive and forget feud (with a family member)
  Better cope with the stresses related to my aging parents
Leisure and Friends
  Be more socially connected (currently available)
  Talkers and listeners (currently available)
  Explore the Art in Happiness (currently available)
  Find more "me" time
  Be a better friend
Love and Intimacy
  Feel more loved by my partner (currently available)
  Feel and be more devoted to my spouse
  Fight less and love more in my relationship
  Find Mr. Right—or Mr. Right Now
  Get over a broken heart
  Feel hopeful to start dating after divorce
Mind and Body
  Cope better with stress (currently available)
  Nurture my Body and Soul (currently available)
  Come to terms with getting older
  Feel healthier
  Be more optimistic about my potential
  Find more purpose and meaning in my life FIG. 6 depicts an example of a user's profile and posts. The profile and posts include the following:
  User's "Digital Happiness" wallet
  Search posts by skill, track, location and topic
  Track progress by Skill level
  View and manage follower/following FIG. 7 depicts an example of personalized suggested activities. The personalized suggested activities include the following:
  When not in a track, users are offered a personalized daily activity
  User's can also pick any activity directly from the skills menu
  New activities unlock as the user achieves higher skill levels A component of Happify is continuous progress tracking, as well as gaining insight into the user's happiness profile. The self-assessments include the following:
My Happiness Score
  Taken initially and every 2 weeks, scientifically valid test correlated with standard well-being tests.
Track Recommendation Survey
  Find out which track is right for the user
  Refer to Table 2, below, for the Question Table and Calculation rules.

TABLE 2

Happify Track Recommendation Survey Question Table

| | | | |
|---|---|---|---|
| — | TR-8 talkers and listeners | — | |
| — | TR-7 body and soul | — | |
| — | TR-6 art in happiness | — | |
| — | TR-5 enjoy parenting more | — | |
| — | TR-4 appreciate what I have | — | |
| — | TR-3 be more socially connected | — | |
| — | TR-2 feel more loved by my spouse | 2x, 0 disables track | |
| Track Multiplier | TR-1 cope better with stress | — | |
| — | O4 | — | |
| — | O3 | — | |
| — | O2 | No (0) | |
| Answer Score | O1 | Yes (1) | |
| — | — | Are you in a serious relationship? | |
| — | Page | 1 | |
| — | — | Q1 | |
| — | — | 0 disables track, 1 -> 0.5 points, 2 -> 4 points | |
| — | — | — | |
| — | 2x, 0 disables track | — | |
| — | — | — | |
| — | — | — | |
| Track Multiplier | — | — | |
| — | — | — | |
| — | — | Often (2) | |
| — | No (0) | a little (1) | |
| Answer Score | Yes (1) | Very rarely (0) | |
| — | Do you have kids? (enables "enjoy parenting more") | How often to you interact with people as part of your work? | |
| — | 1 | 1 | |
| — | Q2 | Q3 | |
| — | — | 0 disables track, 1 -> 0.5 points, 2 -> 4 points | |
| — | 0 disables track, 1 -> 0.5 points, 2 -> 4 points | — | |
| — | — | — | |
| — | — | — | |

TABLE 2-continued

Happify Track Recommendation Survey
Question Table

| | | |
|---|---|---|
| | — | — |
| | — | — |
| Track Multiplier | — | — |
| | Very much (2) | Very much (2) |
| | a little (1) | a little (1) |
| Answer Score | Not at all (0) | Not at all (0) |
| | To what degree do you consider yourself creative? | Do you value physical well-being? |
| | 2 | 2 |
| | Q4 | Q5 |
| | — | — |
| | — | — |
| | — | 2x |
| | — | 2x |
| | 1x | 2x |
| | 1x | — |
| | — | — |
| Track Multiplier | 1x | — |
| | Very (3) | Very (3) |
| | Somewhat (2) | Somewhat (2) |
| | A little (1) | A little (1) |
| Answer Score | Not at all (0) | Not at all (0) |
| | Do you feel like you are not very resilient when bad things happen? | Do you feel like your life is full of drudgery? |
| | 2 | 3 |
| | Q6 | Q7 |
| | — | — |
| | — | — |
| | 1x | — |
| | 1x | 2x |
| | 2x | — |
| | — | 2x |
| | 1x | 2x |
| Track Multiplier | — | — |
| | Very (3) | Very (3) |
| | Somewhat (2) | Somewhat (2) |
| | A little (1) | A little (1) |
| Answer Score | Not at all (0) | Not at all (0) |
| | Do you feel like there isn't much good in your life? | Do you wish you felt more connected with others in your life? |
| | 3 | 3 |
| | Q8 | Q9 |
| | — | |
| | 1x | |
| | — | |
| | — | |
| | 1x | |
| | — | |
| | — | |
| Track Multiplier | 2x | |
| | Very (3) | |
| | Somewhat (2) | |
| | A little (1) | |
| Answer Score | Not at all (0) | |
| | Do you have an ongoing stressful situation that you would like to learn to manage better? | |
| | 4 | |
| | Q10 | |
| | 2x | |
| | — | |

TABLE 2-continued

Happify Track Recommendation Survey
Question Table

| | |
|---|---|
| — | — |
| — | — |
| — | — |
| — | 2x |
| — | — |
| Track Multiplier | — |
| — | Very (3) |
| — | Somewhat (2) |
| — | A little (1) |
| Answer Score | Not at all (0) |
| — | Are you a very sociable person? |
| — | 4 |
| — | Q11 |
| — | — |
| — | 2x |
| — | — |
| — | — |
| — | — |
| — | — |
| Track Multiplier | 2x |
| — | Very (3) |
| — | Occasionally (2) |
| — | Rarely (1) |
| Answer Score | Not at all (0) |
| — | Do you find yourself overly focused on things that happened in the past, or on things that will happen in the future? |
| — | 4 |
| — | Q12 |

Calculation Rules
1. Generate a score for each track (TR-1 to TR-8), made up of the score it gets per question (Q1-Q12) in the following manner:
52. for each question, if the appropriate track multiplier is greater than zero—take the score specified in the option chosen by the user for that question in "( )", multiply it by the track multiplier for the question ("1×", "2×" etc.) and add to the track score
3. if an option with a value specified as 'disabling' has been picked then score for the track should be zeroed.
104. Track with highest score is the recommended one.

TABLE 3

Happify Happiness Assessment Questions

| # | Question | Option 1 | Option 2 | Option 3 | Option 4 | Option 5 | Option 6 | Option 7 |
|---|---|---|---|---|---|---|---|---|
| q1 | in the past month, how often have you felt joyous, exuberant, inspired, or awestruck? | Never | Rarely (once or twice a month) | Occasionally (about once per week) | Frequently (more than once per week) | Very often (almost every day) | — | — |
| q2 | In the past month, how often have you felt serene, grateful, or relaxed? | Never | Rarely (once or twice a month) | Occasionally (about once per week) | Frequently (more than once per week) | Very often (almost every day) | — | — |
| q3 | In the past month, how often have you felt sad, guilty, or lonely? | Never | Rarely (once or twice a month) | Occasionally (about once per week) | Frequently (more than once per week) | Very often (almost every day) | — | — |
| q4 | In the past months, how often have you felt angry, anxious, or afraid? | Never | Rarely (once or twice a month) | Occasionally (about once per week) | Frequently (more than once per week) | Very often (almost every day) | — | — |

TABLE 3-continued

Happify Happiness Assessment Questions

| # | Question | Option 1 | Option 2 | Option 3 | Option 4 | Option 5 | Option 6 | Option 7 |
|---|---|---|---|---|---|---|---|---|
| q5 | How satisfied do you feel with the relationships in your life? | Very dissatisfied | Somewhat dissatisfied | A little dissatisfied | Neutral | A little satisfied | Somewhat satisfied | Very satisfied |
| q6 | How satisfied do you feel with your work life? | Very dissatisfied | Somewhat dissatisfied | A little dissatisfied | Neutral | A little satisfied | Somewhat satisfied | Very satisfied |
| q7 | How satisfied do you feel with your leisure time? | Very dissatisfied | Somewhat dissatisfied | A little dissatisfied | Neutral | A little satisfied | Somewhat satisfied | Very satisfied |
| q8 | How satisfied do you feel with yourself as a person? | Very dissatisfied | Somewhat dissatisfied | A little dissatisfied | Neutral | A little satisfied | Somewhat satisfied | Very satisfied |
| q9 | How satisfied do you feel with the conditions of your life? | Very dissatisfied | Somewhat dissatisfied | A little dissatisfied | Neutral | A little satisfied | Somewhat satisfied | Very satisfied |

Calculation

Positive Emotion Score $$PES = (q1 + q2 + (6 - q3) + (6 - q4) - 4)/16 * 100$$

Life Satisfaction $$LSS = (q5 + q6 + q7 + q8 + q9 - 5)/30 * 100$$

Happiness Score Number $$HS = (PES + LSS)/2$$

Happiness Score Title

| $HS \leq 14$ | $14 < HS \leq 29$ | $29 < HS \leq 43$ | $43 < HS \leq 57$ | $57 < HS \leq 71$ | $71 < HS \leq 86$ | $86 < HS$ |
|---|---|---|---|---|---|---|
| Very unhappy | Moderately unhappy | Mildly unhappy | Neutral | Mildly happy | Moderately happy | Very happy |

Skill Assessments

Helps the user discover which aspects of that skill they're best at, and which they may be interested in further training. Measures affinity and proficiency and is unlocked when the user reaches a certain level in a skill.

Happify Skill Assessments: Method

Assessment

Each skill assessment is composed of an 'affinity' and a 'mastery' assessment for a group of skill categories. The skill 'Give', for example, includes skill categories 'Forgiveness', 'material things' and 'immaterial things'.

The user answers a set of questions for affinity and mastery in each of the skill categories by specifying a number between 1 and 7.

Scoring

Affinity

The user's skill affinity profile is presented as a list of skill categories in decreasing order of average score as answered by the user. Higher average score in a skill category corresponds with a higher level of affinity with that category.

Mastery

The user's skill mastery profile is presented as a list of skill categories in decreasing order of average score as answered by the user. Higher average score in a skill category corresponds with a higher level of affinity with that category.

Recommendation

In addition to the ordered lists, the system flags categories that have these score combinations:

"Keep it Up"

High Affinity/High Mastery—These categories are both preferred by, and mastered by the user. The user may benefit from increasing awareness and using this skill category.

"Try it Out"

High Affinity/Low Mastery—These categories are liked by the users but not yet mastered by them. The user may benefit from engaging in and building their skill level in this category.

Savor Assessment

Step 1: Affinity

What types of savoring experiences do you like?

Please rate the extent to which each of the following is true for you (1=not at all true, 7=very true)

Food

1. I really enjoy it when I take the time to savor food
2. I would consider myself a "foodie"
3. I get very excited when I have the opportunity to eat great food Beauty 4. I find listening to music and/or viewing art to be very enjoyable
5. Watching artists (i.e. actors and musicians) perform fills me with awe
6. I am able to lose myself in art Sensory 7. I love to be in places that are beautiful
8. When I'm outside, I notice the temperature, wind, and other weather conditions and appreciate their impact on me
9. Beautiful scenery fills me with a sense of wonder Social
10. When I am spending time with someone, I often stop and realize how valuable that experience is
11. I am happiest when I am interacting with someone else
12. When I relive some of my most precious moments, they involve other people
Novelty
13. I get excited when I have the opportunity to do something new
14. I appreciate activities the most when I am trying them for the first time
15. It is so much easier to notice every aspect of an experience when it's a new experience
Step 2: Mastery
Rate, on a scale of 1-7 (1=not at all, 7=completely), the extent to which you are able to appreciate—with deliberate effort, in the moment or in retrospect—the complexities of:
Food
1. Your favorite dessert
2. Your favorite special-occasion dish
3. A dish that you eat very often
4. An unusual-tasting dish
5. A dessert that you have never had before, and like
6. A dessert that you have never had before, and do not particularly like
7. A dish that contains flavors you don't like
8. Wine or beer
9. Scotch or other hard liquor
Beauty
10. A piece of art by an unseasoned but talented artist
11. A piece of beautiful art
12. A piece of music from a genre that you love
13. A piece of music from a genre that you are unfamiliar with
14. A piece of music from a genre that you dislike
15. A familiar scenic view—out of your office window, house, on your daily commute, etc.
16. A scenic view that you are seeing for the first time
17. The sight of beautiful architecture
18. A bustling city or other crowded area that's full of activity
Sensory
19. Sitting in a hot tub
20. Receiving a massage
21. Feeling a mild breeze blowing on your face
22. Feeling a bittersweet emotion
23. The feeling of being excited
24. The feeling of being sad
25. Having a foot ache or back ache after a long day of activity
26. Taking a shower
27. Feeling content
Social
28. Hugging or cuddling with someone
29. Sharing a fun experience with someone you care about
30. Sharing a meaningful experience with someone you care about
31. Meeting someone new
32. Having a conversation in which you connect deeply with someone else
33. Having a mild disagreement with someone you care about
34. Sharing a difficult experience with someone you care about
35. Having a conversation with someone you don't have much in common with
36. Sharing an everyday task (cooking, running errands, etc.) with someone you care about
Novelty
37. Trying a new sport
38. Visiting a city you've never been to before
39. Trying a new hobby for the first time
40. Eating a new food for the first time
41. Listening to a new piece of music for the first time
42. Going to a party full of new people, with whom you may or may not connect
43. Watching a movie for the first time
44. Your first day working in a new job, or living in a new town
45. Doing something that is meaningful to you, but not particularly pleasant
Thank Assessment
Step 1: Affinity
Please rate the extent to which the following statements are true for you (1=not at all true, 7=very true)
Expressing to Others
1. I am most happy when I know that the other people in my life feel appreciated.
2. I am thrilled when I have the opportunity to show someone I know how thankful I am for him/her.
3. I never assume that anyone I know is aware of the gratitude I feel for them; I make sure to express it.
Feeling about Others
4. When I step back and think about it, the people in my life give me a lot to be thankful for.
5. So many people have contributed to my being where I am today.
6. I cannot imagine life without my friends, family, and/or coworkers.
Feeling about Circumstances
7. I am lucky to have had many great opportunities in my life.
8. I feel fortunate to have all of my basic needs met (e.g. a place to live, food and clean water).
9. Rather than dwell on what I do not have, I instead focus on the good things that I DO have.
Step 2: Mastery
Expressing to Others
In the last week, how frequently did you engage in each of the following behaviors (1=not at all, 7=as frequently as humanly possible):
1. Complimenting your partner on his/her appearance (if applicable)
2. Expressing your gratitude to someone you know for something he/she did recently
3. Telling your partner, child, or friend about one of his/her quirks that you find endearing
4. Sending a thank-you email or note
5. Verbally thanking someone on the spot in a meaningful way (beyond saying "thanks" when someone opens the door for you)
Feeling to Others
While most people are grateful for other people in their lives, they may not actually FEEL that gratitude on a daily basis. In the last week, did you feel grateful for the following, and if so, how often (1=very rarely, 7=all the time)
6. The emotional support you receive from others in your life
7. Your partner, child, or friend's sense of humor
8. One of your loved ones' quirks
9. The love you feel from someone else in your life
10. The help you receive from others at work or at home
Feeling about circumstances
While most people are grateful for other people in their lives, they may not actually FEEL that gratitude on a daily basis. In the last week, did you feel grateful for the following, and if so, how often (1=very rarely, 7=all the time)
11. The ways in which you have been lucky in life
12. The opportunities that have been given to you by others
13. The successes in your life for which you have had to work very hard
14. The ways in which your life has improved over time
15. The ways in which others are less fortunate than you are Aspire Assessment
Step 1: Affinity
Please rate the extent to which the following statements are true for you (1=not at all true, 7=very true)
Finding Meaning
Involving things that are happening or that have already happened:
1. I have an easier time doing everyday tasks if I have an important reason for doing those tasks.
2. When I look back on the life I lived so far, I am comforted by the idea that I have done things that are important.
3. I find it helpful to look at the positive things that have come out of my most negative experiences.
Creating Meaning
Involving new behavior:
4. When I have had the opportunity to do something new that sounds meaningful to me, I have found it very rewarding.
5. I would prefer do something meaningful over something pleasant.
6. I would feel better investing my money in something important to others rather than something that is likely to benefit me directly.
Goals
7. I feel best about myself when I am living a life in accordance with what I value.
8. I am uneasy without a future goal that I can work towards.
9. I aspire to become the best version of myself.
Step 2: Mastery
Finding Meaning
In the past, how successful have you been at finding meaning in each of the following (1=not successful, 7=very successful):
1. Household chores like dishwashing, sweeping, or doing laundry
2. Doing something together with friends or family
3. Having a major success, like getting a promotion
4. Experiencing a loss (lost job, someone passes away)
Creating Meaning
How frequently do you engage in the following behaviors (1=never, 7=very frequently)
5. Donate money to a good cause.
6. Choose to spend your spare time on activities that are meaningful rather than activities that are pleasant.
7. Find new ways to do something meaningful with your time.
8. Work to promote something you deeply believe in.
Goals
How frequently do you engage in the following behaviors (1=never, 7=very frequently)
9. Make day to day decisions that are consistent with your long-term goals.
10. Choose to spend your time in ways that will help you improve yourself.
11. Keep the "big picture" of your long-term goals in mind when living your everyday life.
12. Approach any significant activity with some time of goal for yourself.

Give Assessment
Step 1: Affinity
Please rate the extent to which the following statements are true for you (1=not at all true, 7=very true)
Forgiveness
1. I find it to be a big relief when I am able to let go of a grudge.
2. I think of forgiveness as a gift that I can give to someone else.
3. I do better if I can avoid getting hung up on things people say or do that I do not like.
Material Things
4. I find giving gifts to other people very rewarding.
5. I would rather give my money away to someone I care about than to spend it on myself.
6. I can think of no better use for money than to have a great experience with the people I care about.
Immaterial Things
7. I feel most content after I have done something nice for someone else.
8. I feel most connected to someone when I have had the chance to do something to help them.
9. I like to be the person people go to first in order to share their good news.
Step 2: Master
In general, how often do you do each of the following when you have the opportunity (1=not at all, 7=very frequently)
Forgiveness
1. Quickly getting over it when I have a disagreement with my significant other, child, or friend
2. Let it go when someone says something that unintentionally hurts me
3. Recovering from a significant conflict with someone else
Material Things
4. Bringing a cup of coffee or other treat to a friend/coworker for no reason
5. Buy wonderful but expensive gifts on birthdays or holidays
6. Choose to spend money on others instead of yourself
Immaterial things
7. Go out of your way to help a friend celebrate good news
8. Spent time helping a friend, colleague, or child with something (e.g. homework, a project)
9. Say something to a friend, colleague, or child with the goal of lighting up their day Empathize Assessment
Step 1: Affinity
Please rate the extent to which the following statements are true for you (1=not at all true, 7=very true)
With Self
1. I find it helpful to "turn off" my inner critic and accept myself as I am.
2. I find it useful to take my extenuating circumstances into consideration before passing judgment on myself.
3. Remembering the positive impact that I have on other peoples' lives helps me to feel good about myself.
With Known Other
4. It is much easier for me to interact with someone who is behaving badly if I can understand where they are coming from.
5. I feel more connected to people I care about when I think of "the whole picture" of their lives.
6. I am more secure in my relationships when I have a clear understanding of how the other person benefits from my presence in their life.

With Unknown Other
7. I want to understand the viewpoints of people who are very different from me.
8. Even if another person does something I strongly disagree with, I think there is benefit in knowing their motivation.
9. I believe that in order to judge a person, I need to put myself in their position.

Step 2: Mastery
With Self
In general, how difficult is it for you to do each of the following (1=not difficult at all, 7=extremely difficult):
1. Remember the ways in which you have a positive impact on the world around you
2. Forgive yourself for making a minor mistake (locking yourself out of your car, forgetting a meeting)
3. Forgive yourself for making a significant mistake (missing an important deadline, forgetting a child's sports game or concert, forgetting a close friend or family member's birthday)
4. Forgive yourself for making a grievous mistake (making a job-related error that gets you fired, crashing your car with other people in it)

With Known Other
In general, how difficult is it for you to do each of the following (1=not difficult at all, 7=extremely difficult):
5. Be understanding when your friend, significant other, or child gets stressed out and snaps at you
6. Be a good listener to a friend, significant other, or child who is distressed about something
7. Understand why the others in your life care about you—what impact you have on them
8. Help someone else understand where your friend, significant other, or child is coming from With unknown other
In general, how difficult is it for you to do each of the following (1=not difficult at all, 7=extremely difficult):
9. Have an extended conversation with someone whose views you do not understand
10. Feel sympathy for someone else's perspective when you strongly disagree with it
11. Imagine the factors that impact someone whose life is very different from yours
12. Help someone else understand a perspective that is very different from their own Activity Mood
As part of reporting an activity, 1-click mood picker Strength Test
Finding out one's top character strengths Happify Strengths Assessment: Method
Assessment
The assessment is composed of five subscales with 6 items each, each with user rating on a scale of 1 to 7.

Classification
Users would be classified based on which of the two subscales are highest for them:
1. Emotional-Interpersonal
2. Emotional-Intellectual
3. Emotional-Restrained
4. Emotional-Future Oriented
5. Intellectual-Interpersonal
6. Intellectual-Restrained
7. Intellectual-Future Oriented
8. Interpersonal-Restrained
9. Interpersonal-Future Oriented
10. Future Oriented-Restrained Questions
For each of the statements below, please choose the degree to which it describes what you are like, from 1 ("very much unlike me") to 7 ("very much like me"):

Interpersonal
1. I tend to be most focused on other people and the ways in which I am connected to other people.
2. I get more gratification from treating someone else with kindness than I do from being treated kindly.
3. I prefer to make decisions collaboratively with others rather than independently.
4. If I can do a project or activity in a group, I prefer that over working alone.
5. It is important to me that others in my life feel heard and respected.
6. Harmony with the other people in my life is very important to me, so I work hard to resolve disagreements or misunderstandings as quickly and effectively as possible.

Emotional
7. At a social event or dinner party, I always manage to make other people laugh.
8. I am skilled at perceiving what people want, expect, and need.
9. I am able to overcome fear to persist in doing something intimidating.
10. When I am presented with two options, I am usually able to choose the most sensible one over the one that is most fun/exciting.
11. I am often able to help mediate conflicts or misunderstandings between other people.
12. I thrive in tasks that require creativity.

Intellectual
13. I like to spend my spare time reading about new and interesting things.
14. Nothing is more moving to me than a place with beautiful scenery.
15. I feel a deep connection to art and/or music and/or literature.
16. If I meet someone who works in a field I know nothing about, I am very eager to learn more about it by talking to them.
17. My favorite hobbies are those that involve learning a new skill.
18. I can enjoy doing nearly anything as long as it's a new experience.

Restraint
19. I will be honest with someone even if they won't like what I have to say.
20. I value being authentic above being pleasant or agreeable.
21. I usually persist until I meet my goals, regardless of how difficult things get.
22. When people describe a situation to me, I am generally able to offer a new perspective they have not thought of.
23. I am often able to explore a problem from many different points of view.
24. When a challenge occurs, I find a way around the challenge rather than giving up.

Future Orientation
25. More so than the average person, people call me "positive" or "upbeat."
26. Whatever happens, I am able to see a positive way that things can work out.
27. I am often thinking about and planning for the future.

28. I am skilled at improving my own mood when I feel down.
29. I feel strongly connected to something larger than myself.
30. I believe that what I do now has a meaningful impact on someone or something in the future.

Track Customization
    Modify track behavior based on self-assessments and past behavior Users can share their posts, then comment on and like others' posts. Users can follow other users and users can invite other users to Happify.

New users are encouraged to follow others who are similar to them. Match is composed of Demographic, Psychological and Happify Reputation score (see 'happify follower matching' doc).

Figure 8:
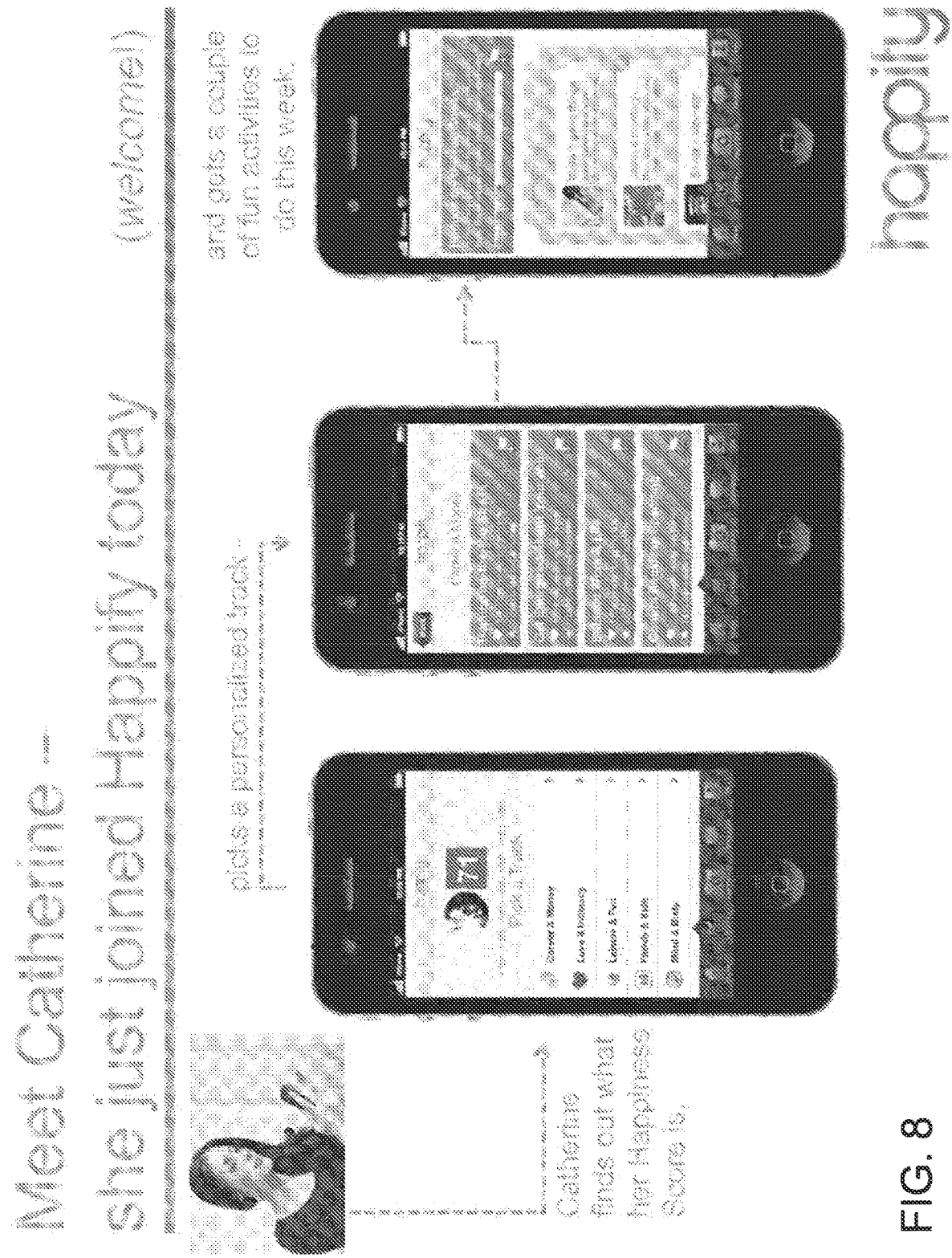
FIG. 8 depicts a schematic of the initial steps of the Happify compass.

FIG. 8 depicts a schematic of the initial steps of the Happify compass. The user finds out what her Happiness Score is. The user picks a personalized track and is given fun activities to do her first week.

Figure 9:
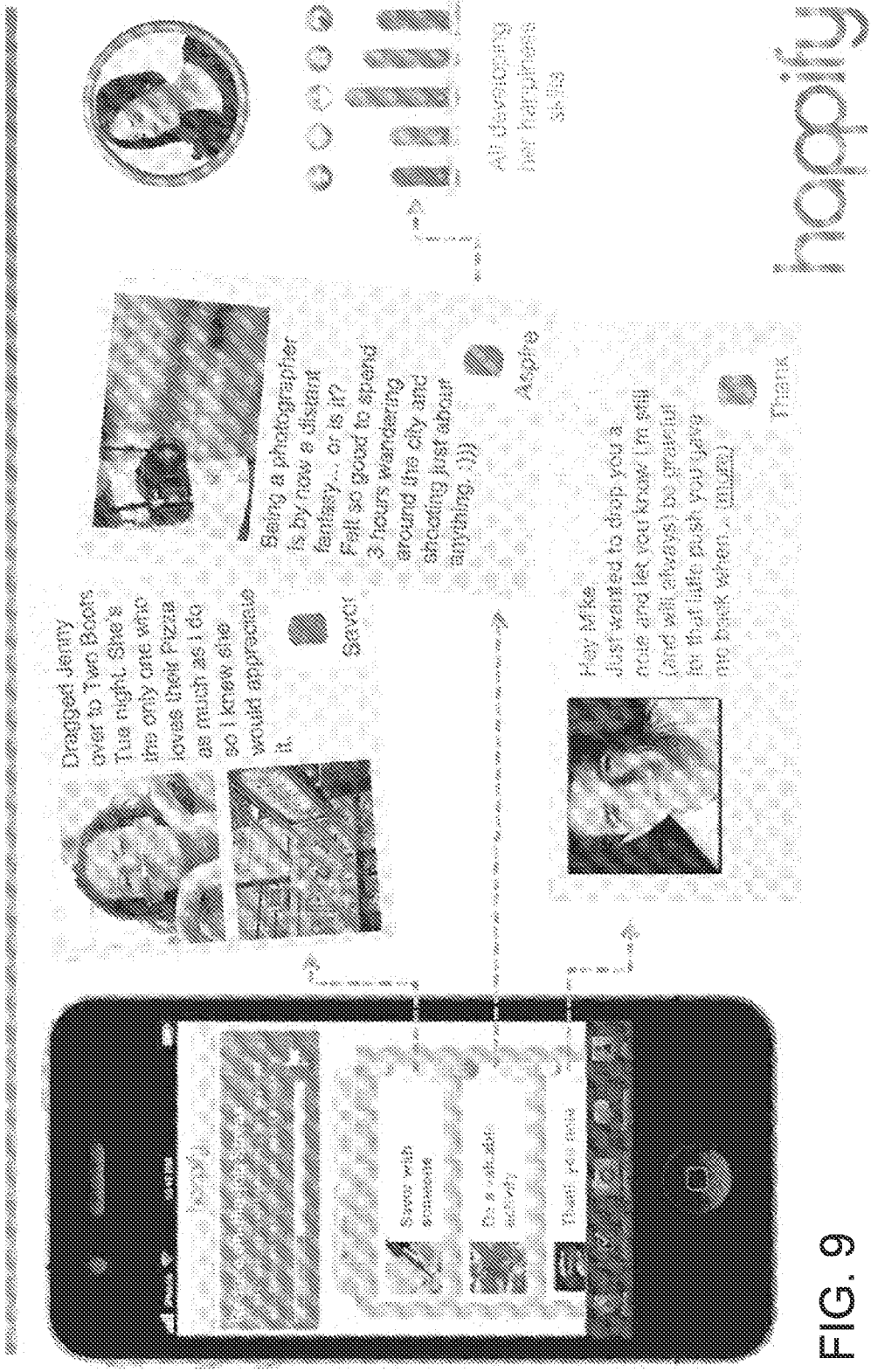
FIG. 9 depicts the user's first week of activities.
Figure 10:
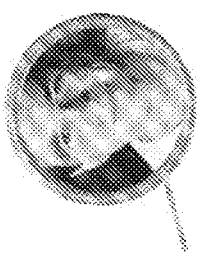
FIG. 10 depicts a schematic of the user's happiness graph.
Figure 10:
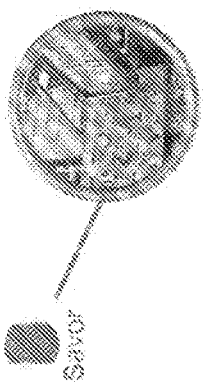
Figure 10:
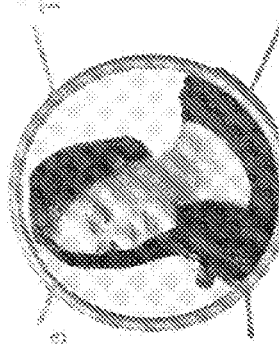
Figure 10:
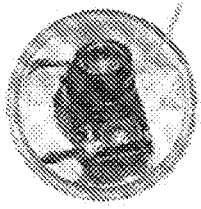
Figure 10:
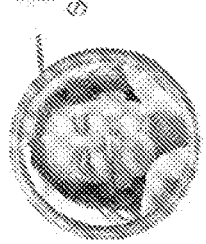
Figure 10:
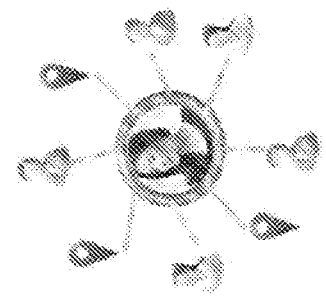
Figure 11:
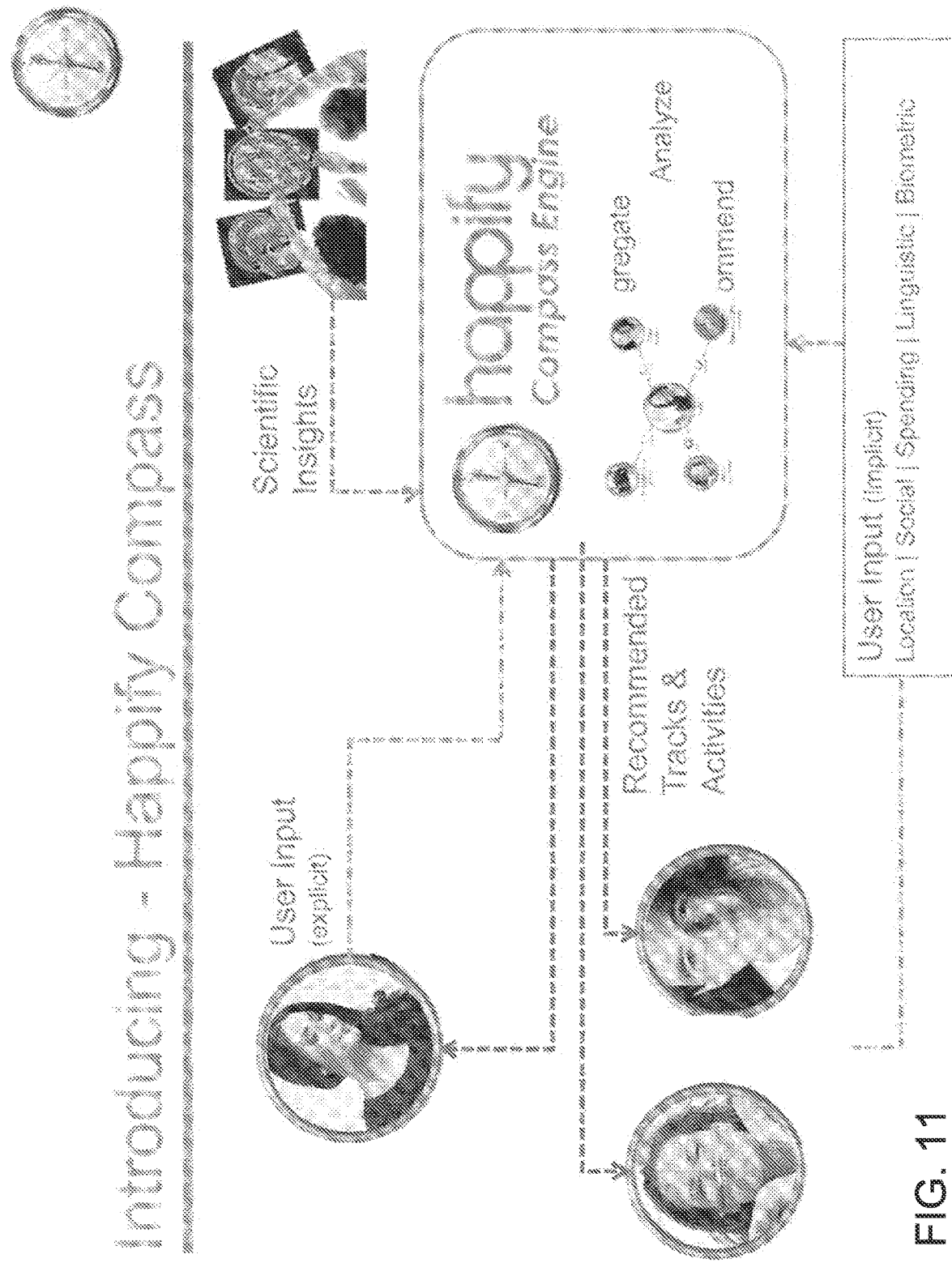
FIG. 11 depicts the user's happiness compass.
Figure 12:
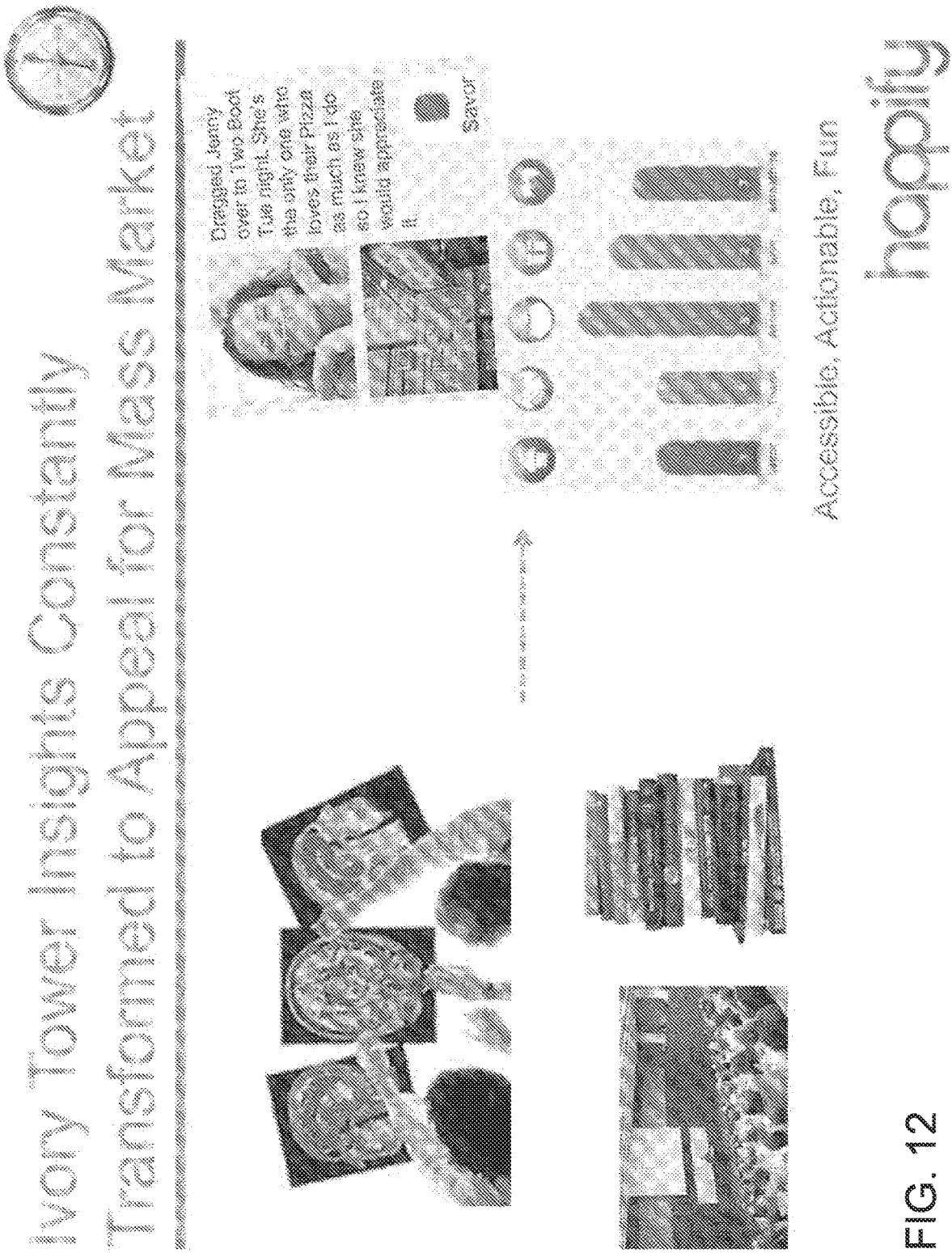
FIG. 12 depicts a schematic of insights obtained using the happiness compass.

FIG. 9 depicts the user's first week of activities.
FIG. 10 depicts a schematic of the user's happiness graph.
FIG. 11 depicts the user's happiness compass.
FIG. 12 depicts a schematic of insights obtained using the happiness compass.

Figure 13:
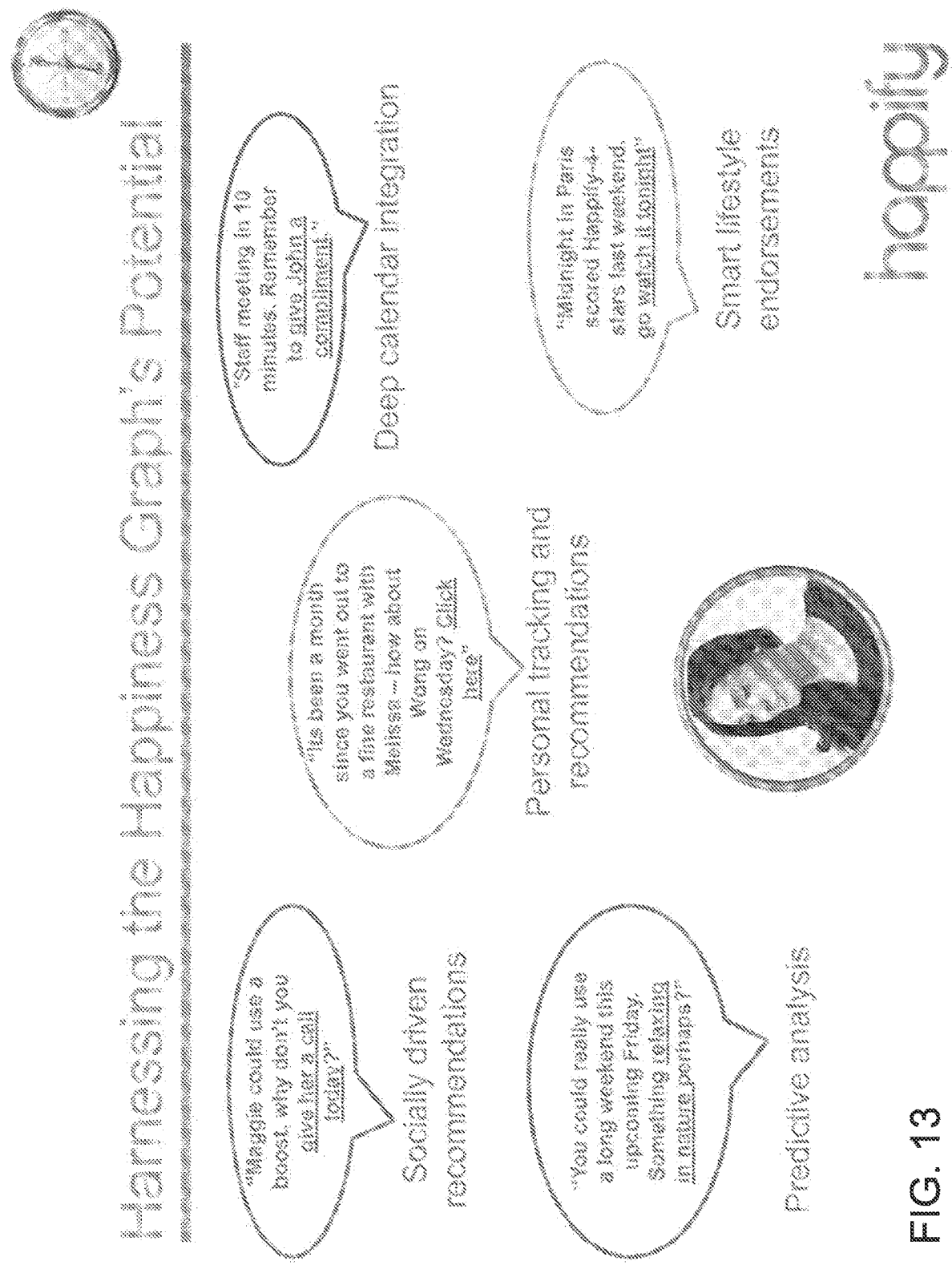
FIG. 13 depicts examples of advantageous aspects of the happiness graph.

The following provides some examples of information obtained using the happiness compass, which are a rich array of implicit user input sensors:

Presence
    Location
    Calendar
Social
    Level of interaction
    Meaningful relationships
    Preferred locations
Spending
    Purchase preferences
    Spending levels
Communications
    Natural language processing
    Pattern analysis
    Facebook, Twitter, email
    Happify posts
Self Reporting
    Preferred Activities
    Scientifically backed self tests
    Biometrics
    Exercise
    Sleep patterns
    Nutrition
    Voice analysis
    Facial expressions
    Heartbeat FIG. 13 depicts examples of advantageous aspects of the happiness graph.

Figure 14:
FIG. 14 depicts an example of a quiz.
Figure 15:
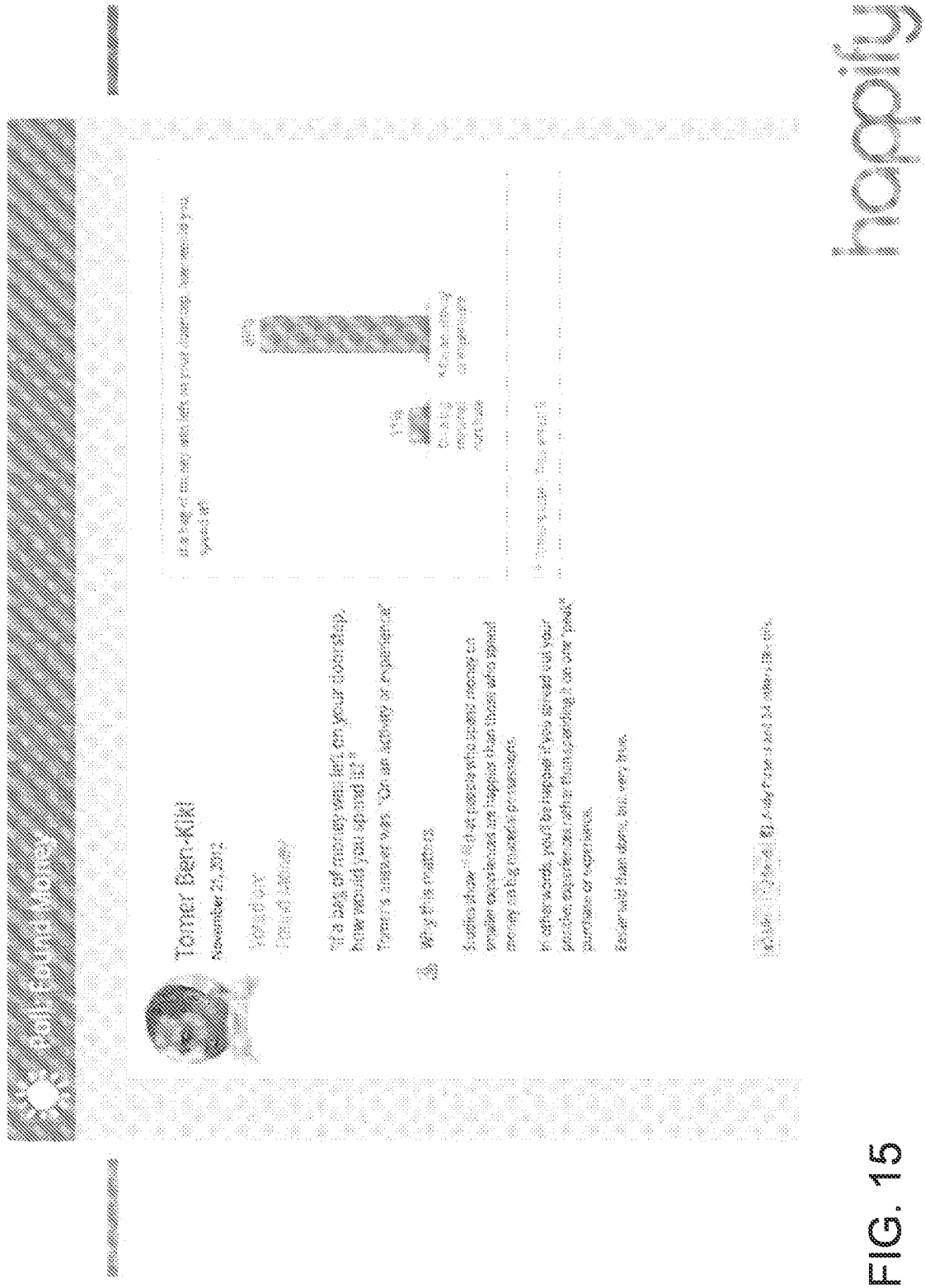
FIG. 15 depicts an example of a poll.

Some benefits of the embodiments described herein are:
Clarity
    5 skills, level progression
Integrated Self Assessments
    Provides self-insights
    Recommends tracks & activities
Progress Measurement
    Periodic happiness measurements allow the user to monitor their progress
Guided Experience
    4 week track experience optimizes habit formation
    Enables continued focus on a specific topic (e.g. parenting, stress)
Flexible
    Track structure allows the user to pick the activities and tasks they prefer from a wider selection of options
Personalized
    COMPASS activity recommendations are based on past user behavior and preference
Integrated Social Experience
    Users share and follow, like and comment on other users' posts
Increasingly Challenging
    As they progress, tracks require increased number of activities and higher level of challenge
Entertaining
    Variety of activity types
    Track content
Extendible in Several Dimensions
    Content: new tracks and track content (tasks, quizzes, polls etc.)
    Activity types: adding new games and activity types (see product directory)
    Framework: adding new skills
Multi Screen
    web, mobile accessibility The following attributes are unique to Happify compared to other digital well-being services:
Science-to-Action Framework
    Translation of the science of happiness into 5 skills, named activities per skill and actionable tasks per activity
Sustained Guidance
    Other feedback mechanisms either track external user activity with visually-limited feedback, or allow users to grow visual environments by interacting with them directly (and not use them to provide feedback on external activities)
Contextual Social Interaction
    Users socialize around contextual activity posts prescribed to others
Activity Variety
    "One stop show" happiness service with real-life, reflective and gaming activities
Measure—Act—Measure loop
    Allowing users to track their progress as they go
1. All Skills
Reflective Micro-Blogging
    User is asked to reflect on an aspect of their life an write a few sentences about it. For example—what they are grateful for, what is the true meaning of their job or in what ways they make the life of their spouse better.
Plan-do Activities
    User is given an activity to do in real life and write a few sentences about how it felt to do it. This could be giving a small gift to someone, savoring their favorite food or spending an hour doing something meaningful to them.
Quizzes:
    FIG. 14 depicts an example of a quiz.
Polls
    FIG. 15 depicts an example of a poll.
Inner Circle
    Allow the user to build a list of their closest people who affect their happiness the most, then direct the users to do certain activities with the Inner Circle—like sharing posts and experience boards (see below) etc.

Happiness Check-In

Quick report of user's mood from mobile or web, show stats/people nearby on map

Happify Compass

Recommends activities for users based on the Happiness Graph (=happiness 'GPS')

2. Savor

Music Moments

Identify and share the music that makes you happy. User picks a decade they love, scan through top music by year/genre and build their happy music wallet.

Relaxation Game (Savoring—Mindfulness)

Figure 16:
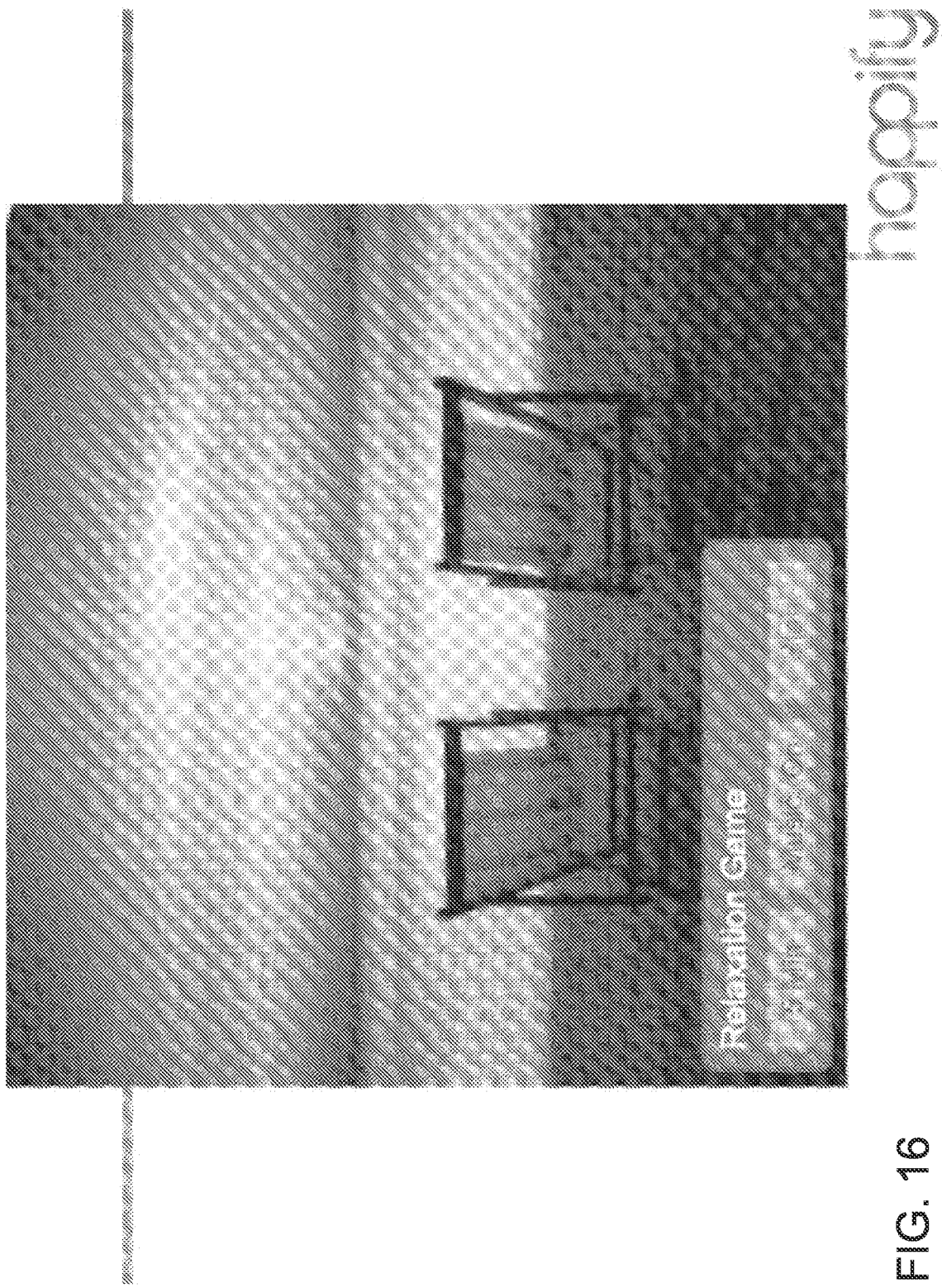
FIG. 16 depicts an example of a relaxation game.

FIG. 16 depicts an example of a relaxation game.

Introduction to mindfulness/meditation: user picks a beautiful video scene they like, and just relaxes for 2 to 5 minutes 3. Thank Don't Break the Thank Chain!

User sends a quick gratitude note to a friend, tasking them to continue the chain of thanks. Present leaderboards with longest chains and map view.

4. Aspire

Positive Popper (Optimism)

Figure 17:
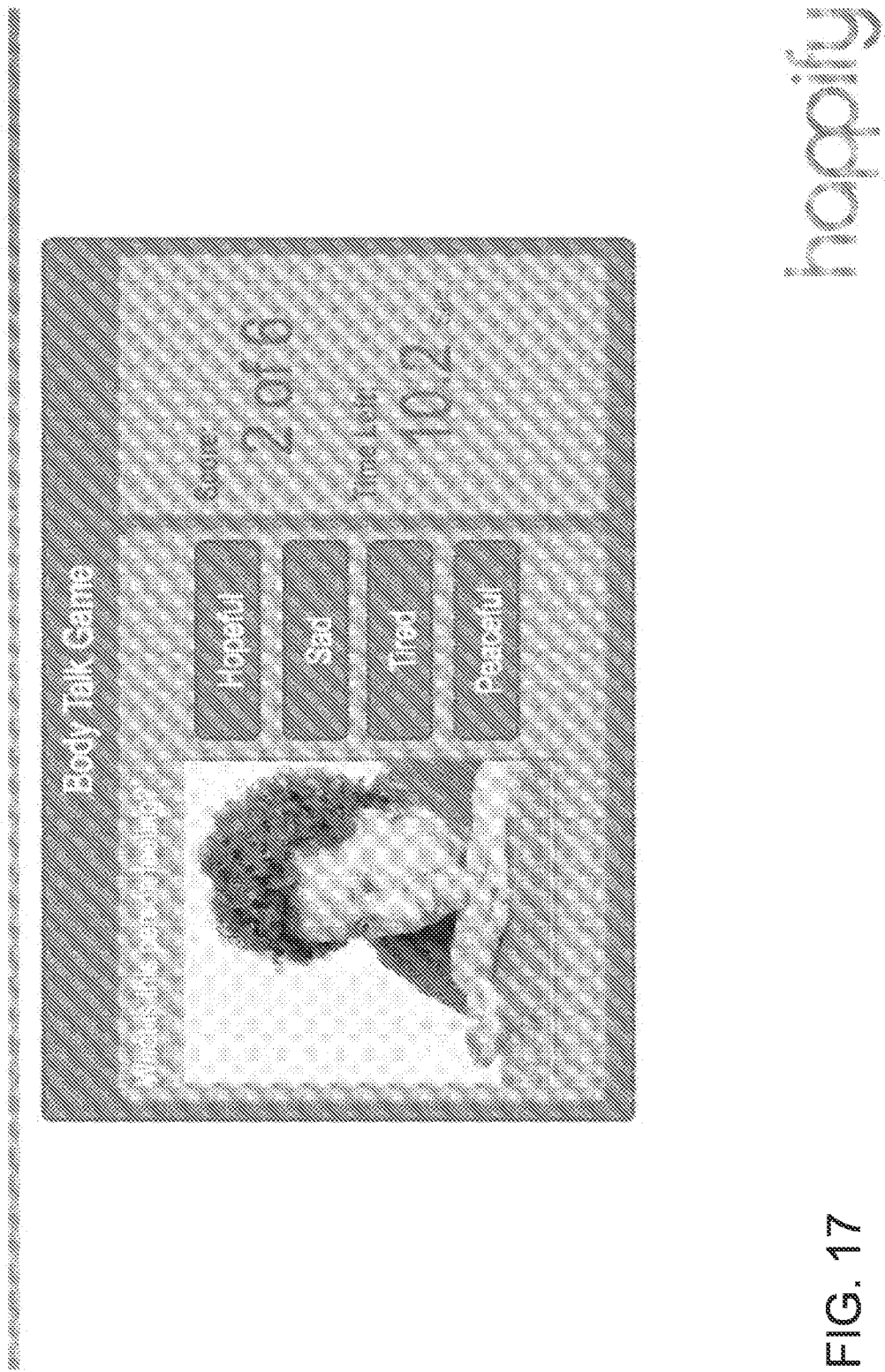
FIG. 17 depicts an example of a body talk game.

Balloons containing positive/negative emotions launch into the game board, user needs to only click the ones with positive emotions 5. Give Send an e-Gift Allow users to give a small gift to a friend directly from the site Donate Allow users to make a donation directly from the site 6. Empathize FIG. 17 depicts an example of a body talk game. The user click on the emotion that matches the photo. See photo of a person displaying an emotion, click on the right emotion from a list of four emotions.

Step 1: Track Name and Introduction

What is a Track?

A Happify track consists of sets of activities programmed together to address a specific life issue or goal.

A track name is actionable and concise (5 words max). A track description (140 words max) introduces the user to the track and explains what the user will achieve by completing the track.

The partner may write an intro OR provide key messaging points for Happify staff to write the introduction to the track.

Examples of existing tracks: Cope Better with Stress; Enjoy Parenting More; Strengthen My Friendships; Appreciate What I Have Tracks fall under one of 5 life domains:
  Career & Money
  Family & Kids
  Leisure & Fun
  Love & Intimacy
  Mind & Body Track Parts and Activities Each track consists of 4 parts—each of which takes approximately one week for users to complete. (If they run out of time, they have the option to extend their time by another week.)

Each Part of a track contains a balanced mix of "reporter" activities and "light" activities (see explanation below). The reporter activities gradually increase in difficulty as users progress through each of the 4 Parts.

"Light Activities" include:
  Games (currently, Hidden Object "mindfulness" game)
  Quizzes (4 multiple-choice or true/false questions about a happiness topic)
  Activity Quizzes (Users read a science paragraph about a Happify activity and are quizzed with multiple-choice questions at the end)
  Polls "Reporter activities" fall into two categories:
  "Essay" or "Do" activity (Reflective microblogging): Asks user to reflect on a subject and make a log entry
  "Plan-Do" activity: Requires user to plan and perform an action in the real world, then come back and report on how it went S.T.A.G.E.: The 5 Happiness Skills Happify's psychologists have created 55 science-based activities to help users build 5 essential happiness skills (Happify's "S.T.A.G.E." framework):

1. Savor—Noticing the good stuff around you and taking time to prolong and intensify your enjoyment of the moment. It can involve the past (reminiscing) the present (mindfulness) or the future (positive anticipation)
2. Thank—Practicing gratitude; identifying and appreciating the things we have and the people in our lives
3. Aspire—Feeling hopeful, having a sense of purpose and meaning in our lives, being optimistic.
4. Give—Performing acts of kindness; being generous and forgiving
5. Empathize—Imagining and understanding the emotions, behaviors, or ideas of others; having compassion BELOW: Example of 11 activities that teach the skill of Giving. (Refer to Happify Activity spreadsheet for detailed list of all 55 activity descriptions)

*What Can't be Added to a Happify Track:

New skills beyond S.T.A.G.E. skills cannot be added to a Happify track. In rare cases, a new activity may be added to an existing Happify skill ONLY if the creator can provide substantial scientific research on the intervention's effectiveness.

| ID | Skill | Name of Activity | Skill Level |
|---|---|---|---|
| G-01 | Give | Give a small gift | 1 |
| G-03 | Give | Make someone smile | 1 |
| G-04 | Give | Act of kindness (3 in one day) | 1 |
| G-05 | Give | Spend time on a valuable activity | 2 |
| G-06 | Give | Spend money on a shared experience | 3 |
| G-09 | Give | Spend time with someone | 3 |
| G-02 | Give | One day, 5 nice things | 4 |
| G-07 | Give | Celebrate someone's good news | 4 |
| G-08 | Give | Forgive an annoyance | 4 |
| G-10 | Give | Forgive an offense | 5 |
| G-11 | Give | Volunteer | 5 |
| G-12 | Give | Donate money for a cause | 5 |

Step 2: Create a Track Outline

The key to programming a track is to select activities that will build happiness skills in the context of a specific life domain or goal.

The track creator can choose from the 55 activities (see Happify Activity spreadsheet for names, descriptions, skill levels) when programming a track.

Key Points:
  What are the underlying "emotional issues" (ex: low self-esteem, loneliness, lack of motivation) that are most likely linked to the "problems" underlying the issue that the Track targets?

Which S.T.A.G.E. skills and their activities are most effective in helping users overcome these issues?

The 7-day sequence of every track Part should have a narrative purpose and feel like it has a beginning, middle, and an end that gives the user a sense of accomplishment.

First days of a track Part: These activities jump-start a key positive emotion the user will need for subsequent activities or asks the user to try something new, intriguing, fun, or funny—which rattles the user out of her funk and gets her in a good mood for what's next.

Middle of a track Part: These activities build on (or complement) previous ones. Here's where we may introduce an activity that requires some extra thought or action. By Day 4 or 5, user feels a little more committed or motivated and willing to take on slightly more demanding activities.

End of a track Part: On the last day of a track Part, users want something that's fun, easy or inspiring—avoid unfamiliar/demanding tasks. The user anticipates a feeling of accomplishment but is intrigued enough to commit to the next Part of their track.

Goal: Create an appealing balance between activities that can be completed immediately by writing after a few minutes of reflection VS. activities that require action (and in some cases, pre-planning) before reporting on how it went.

In general, easier (level 1 and 2) activities are programmed towards the beginning of a track (Parts 1 and 2) and as a user progresses to the later Parts of a track, the activities become more difficult (level 4 and 5 activities), but this isn't required.

Users are awarded badges based on how many activities they complete in each Part of a track. (see chart below for explanations)

The Happify team can design special badges for each Part of a track.

The basic structure of every Part of every Happify track is as follows: (Note that Games and activity quizzes already exist on Happify)

Track Name: Appreciate What I Have

| Part 1 | | Task 1 | Task 2 | Task 3 |
|---|---|---|---|---|
| General recommendation: Reporter activities from Skill Levels 1 and 2 6 total activities: Users must complete 4 to get a badge, 5 for a blue-ribbon badge | | | | |
| reporter | (T-04) Thx Thx Thx | Not that into you (anymore!) | Love what you have | You Decide How |
| quiz | Glory of Gratitude | — | — | — |
| game | The Street | — | — | — |
| reporter | (G-03) Make Someone Smile | For someone close to you | Spur of the moment | You Decide How |
| poll | You Just Won the Lottery | — | — | — |
| reporter | (S-01) Savor the Small Stuff | Savor home sweet home | Savor your neighborhood | You Decide How |

-continued

Track Name: Appreciate What I Have

| Part 2 | | Task 1 | Task 2 | Task 3 |
|---|---|---|---|---|
| General recommendation: Reporter activities from Skill Levels 2 and 3 7 total activities: Users must complete 5 to get a badge, 6 for a blue-ribbon badge | | | | |
| reporter | (A-03) What's my why? | Find meaning at home | Find meaning at work | The big picture |
| activity quiz | Power of meditation | — | — | — |
| reporter | (S-03) Savor Together | Start spreadin' the news | Cel-E-brate good times | You Decide How |
| game | The Beach | — | — | — |
| reporter | (E-01) Give myself a break | Take another's point of view | Reverse the golden rule | Be your biggest fan |
| poll | Happiness and sleep | — | — | — |
| reporter | (T-04) Thx Thx Thx | Angelina is jealous of . . . | Pretend shop | You Decide How |

| Part 3 | | Task 1 | Task 2 | Task 3 |
|---|---|---|---|---|
| General recommendation: Reporter activities from Skill Levels 3 and 4 9 total activities: Users must complete 6 to get a badge, 8 for a blue-ribbon badge | | | | |
| reporter | (T-04) Thx Thx Thx | Thanks for your time | Thanks for the laughs | You Decide How |
| quiz | A little money goes a long way | — | — | — |
| reporter | (G-01) Give a Small Gift | For a friend or coworker | For someone you love | You Decide How |
| poll | Your down time | — | — | — |
| reporter | (S-02) Body Scan Meditation | Body scan meditation | — | You Decide How |
| game | The folly | — | — | — |
| reporter | (E-03) What's My Positive Impact? | All in the family | That's what friends are for | You Decide How |
| activity quiz | Savor the moment | — | — | — |
| reporter | (T-04) Thx Thx Thx | About yourself | — | You Decide How |

| Part 4 | | Task 1 | Task 2 | Task 3 |
|---|---|---|---|---|
| General recommendation: Reporter activities from Skill Levels 4 and 5 9 total activities: Users must complete 6 to get a badge, 8 for a blue-ribbon badge | | | | |
| reporter | (T-02) A week's worth of thanks | Love the things you say | Love the things you do | You Decide How |
| activity quiz | Avoid overthinking | — | — | — |
| reporter | (G-06) Spend Money on a Shared Experience | Familiar in a new way | New and unfamiliar | You Decide How |
| game | Snow walk | — | — | — |
| reporter | (T-02) A Week's Worth of Thanks | Thanks for not happening | It could be worse! | You Decide How |

-continued

| Track Name: | Appreciate What I Have | | | |
|---|---|---|---|---|
| poll | Top thanks | — | — | — |
| reporter | (T-05) What Am I Proud Of? | From your past | From your future | You Decide How |
| quiz | Spend Time with Someone | — | — | — |
| reporter | (T-02) A Week's Worth of Thanks | The best in you | What if? | You Decide How |

How Strict are these Guidelines?
 The mix of activities doesn't have to adhere strictly to the framework above. However, we recommend incorporating a mix of approximately 50% "reporter" activities and 50% "light" activities in each track Part to avoid overwhelming the user.
 It's okay for an activity to appear more than once in a track if it's a crucial activity for the track theme and there are new/different suggested tasks for each use.
 Number of activities per track Part is flexible.
Step 3: Come Up with 2-3 Suggested Tasks for Each Activity
 Once the "reporter" activities are determined for each track Part, come up with 2-3 suggested tasks for each activity. These tasks retain the essence and the science of the proven intervention activity, but make sense within the theme of the track. They're fun, yet give clear and concise directions. A user will pick ONE of these tasks to complete in order to get credit for the activity.
 When a user selects this activity, s/he can choose one of the 2 suggested tasks or a 3rd "You Decide How" option (which already exists in the Happify system).
 Partner may come up with general idea for the suggested task, and Happify's writers can flesh these out into 80-word instructions (OR, partner may wish to write all tasks in instruction form)
 Each suggested task is accompanied by a "Why It Works" section, which includes science references and explains why the activity is useful and how it relates to happiness.
  Why it Works" already exists for each activity on Happify, but in certain cases, the track creator may want to add new science references that relate specifically to the theme of the suggested task. (For example, an empathy activity may reference a few studies about empathy and its effects, but in the context of a Parenting track, the Why It Works for a suggested task may reference a study about parents empathizing with kids.)
Sample Activity and Suggested Tasks:
Track: Feel More Loved by My Partner
Activity Name: Today's Grateful Moment [Skill: Thank]
Suggested Task #1:
Name: The Little Stuff Counts
 Think of the reason you first fell in love with your partner or spouse—a trait or characteristic he/she still holds today.
 It could be his sense of humor, her kind generosity, or maybe his sex appeal. Jot down some thoughts and spend a minute appreciating those same traits today.
Suggested Task #2:
Name: Thanks, Partner!
 Think of one good thing that happened today involving your partner or spouse.
 Write it down here and add a few details about how it made you feel and the role you played, if any, in the positive experience.

Figure 18:
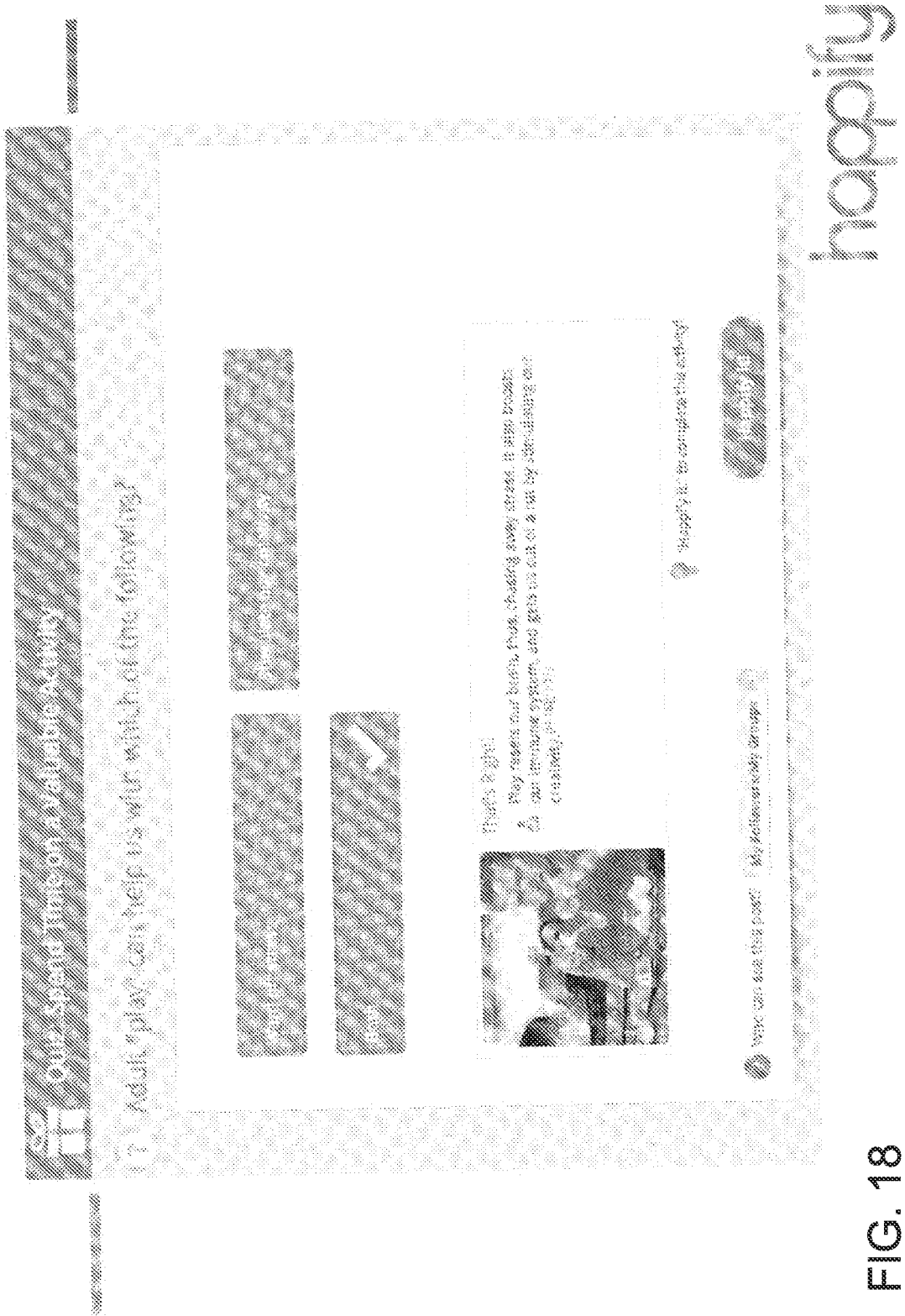
FIG. 18 depicts an example of a quiz.

You Decide How: (already exists on Happify)
 Think of something, great or small, that you feel grateful for and describe it in a few words. Add a photo, too!
Why It Works:
 Numerous studies show that gratitude is one of the strongest predictors of positive mental health. People who are grateful are more satisfied with their relationships with friends and family. They're happier, less depressed and less stressed. They feel more in control of their lives, have higher self-esteem and cope better with stress.
 When the going gets tough, grateful people learn from the experience. They don't avoid the problem, deny there is a problem or blame themselves for the problem. That's probably why grateful people also sleep better!
 In a 2005 study [T-2], some participants were asked to transcribe, every night for one week, three positive events that happened during their day, as well as the causes of these events. Compared to participants in the control group, participants who reflected on three positive events experienced more happiness.
 Users only need to complete ONE of the task options in order to get credit for a given activity.
Step 4: Determine Quiz Topics and/or Write Quizzes
 Each track typically has 3 multiple-choice quizzes, but this can be more or less if desired. FIG. 18 depicts an example of a quiz.
  Quizzes can have two answer choices (usually True/False) or 4 answer choices
  Quiz questions may be based on studies or factoids relating to the track theme, or they can be based on one specific S.T.A.G.E. skill learned in that particular track Part. (Ex: A quiz about gratitude)
   Track creator may provide suggested topics for Happify staff to write multiple-choice quizzes (providing relevant studies from which to draw questions if desired) OR creator can write complete quizzes with a 1-2 sentence intro, questions, answer choices, and a few sentences explaining the correct answer, citing references (many already exist on happify.com/research) whenever possible.
  Word counts:
  Quiz name: 2-4 words
  Quiz intro: 50 words max
  Quiz question: 20 words max
  Quiz choice: 10 words max
  Quiz answer: 50 words max
Step 5: Suggest Poll Topics
 Each track typically contains 4 polls, one for each Part of the track. Again, track creator may suggest topics OR write the entire poll.
 Each poll question has up to 4 possible answer choices, plus a 2-3 sentence summary citing any interesting research around that particular poll topic.
Recap
 1) Work with Happify staff to determine track topic and goals/description of the track.
 2) Create a track outline: What activities will be used? What mix of reporter activities and light activities will be used in each Part of the track?
 3) Come up with 2-3 suggested tasks for each reporter activity. Include additional research or write-up for "Why It Works" with related science references if appropriate. (Happify staff can write full instructions for the suggested tasks, or you can!)
 4) Quizzes: Creator may provide topics for Happify staff to write into quizzes OR write quiz questions and answers him/herself 5) Polls: Creator may provide topics for Happify staff to write OR write quiz questions and answers him/herself Happify Follower Matching:

When a user signs up, they autofollow existing users according to the following method:

Step 1: Create a List of Candidates

All Users who's reputation level is above a certain threshold AND have approved that their profile would appear for follow suggestion Step 2: Calculate Fit Levels

| Criteria | High Fit for . . . | Formula |
| --- | --- | --- |
| — | — | — |
| Demo Fit | — | Average of below |
| Age | age close to user's | 1 − ABS(Age − UserAge)/UserAge |
| Location | close to user | same city: 1, same state: 0.75, same country: 0.5 |
| — | — | — |
| Psych Fit | — | Average of below |
| Happiness Score | high result | (100 − HS)/100 |
| Track Recommendation results | close to user | 1 if all 3 recommended tracks are same and in same order 0 if there is no match |
| — | — | — |
| Reputation Fit | — | — |
| Reputation | high reputation | 1 − 1/Reputation |

Step 3: Calculate Match Score

Match Score=⅓*Demo-Fit+⅓*Psych-Fit+⅓*Reputation-Fit

Step 4: Pick Auto Followers

Same gender: pick 4 people at random from the top 20 matches of the user's same gender.

Opposite gender: pick 2 users at random from the top 10 matches of the other gender While certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure.

We claim:

1. A system for providing an online service and social community for engaging, learning, and training skills for happiness, the system comprising:
 a processor; and
 memory storing instructions which when executed by the processor configure the processor to:
  provide the online service via a network to a plurality of computing devices used by users to interact with the online service via the network;
  provide a plurality of tracks, wherein each track includes a set of activities, and wherein:
   the activities are programmed to address a specific goal,
   the activities are arranged in subsets such that the number and difficulty level of activities increase as the users progress through the subsets,
   the activities are gradually made available to the users based on progress made by the users in building their skills, and
   the activities include links to studies about the activities directly accessible by the users;
  provide an initial happiness score and a track from the plurality of tracks to a user based on:
   a self-assessment completed by the user upon signing up for the online service;
  receive from the user, after completing each of the activities from the track, a post including the completed activity and data added by the user to the post, wherein the post is marked by the user as private or publishable to other users following the track to offer comments;
  store the posts in a profile of the user to allow the user to subsequently search the posts based on skills and tracks for reflection;
  monitor progress of the user based on self-assessments periodically completed by the user, wherein each self-assessment includes:
   a happiness score ("HS") determined based on a first set of rules, the first set of rules including:

$$HS = \frac{(PES + LSS)}{2}, \text{ where}$$

Positive Emotion Score ("PES") =

$$\frac{(q1 + q2 + (6 - q3) + (6 - q4) - 4)}{16} \times 100, \text{ and}$$

Life Satisfaction Score ("LSS") = $\frac{(q5 + q6 + q7 + q8 + q9 - 5)}{30} \times 100$; and a recommended track selected for the user based on a second set of rules;
  modify the track based on the self-assessments;
  suggest followers to the user from the users whose profiles match the profile of the user in terms of demographics, psychographics, and level of activity of the users on the online service using a third set of rules, wherein the followers and the user share posts and socialize around shared contextual activity posts; and
 generate a happiness graph for the user that correlates the activities and the followers with their impact on the happiness score of the user, wherein the online service optimizes the activities based on the happiness graph, and data received from a plurality of input sensors, the data including at least location, calendar, purchase preferences, and heartbeat data.

2. The system of claim 1 wherein the instructions further configure the processor to determine the happiness score using the first set of rules by:
 presenting a plurality of questions to the user;
 receiving answers to the questions from the user;
 generating a positive emotions score based on a first combination of a first plurality of the answers;
 generating a life satisfaction score based on a second combination of a second plurality of the answers;
 and generating the happiness score based on the positive emotion score and the life satisfaction score.

3. The system of claim 2 wherein the instructions further configure the processor to select the first plurality of the answers that are different than the second plurality of the answers.

4. The system of claim 2 wherein the instructions further configure the processor to generate the happiness score based on an average of the positive emotions score and the life satisfaction score.

5. The system of claim 1 wherein the instructions further configure the processor to elect the recommended track using the second set of rules by:
   presenting a plurality of questions to the user, wherein for each question, a first weight is assigned to each track;
   receiving answers to the questions from the user, wherein an answer for each question is selected from a plurality of choices, and wherein each choice is assigned a second weight;
   generating a score for each track by taking products of the second weights of the choices selected by the user in the answers to the questions and the first weights assigned to the track for the questions, and by adding the products; and
   selecting the track with the highest score as the recommended track.

6. The system of claim 1 wherein the instructions further configure the processor to suggest the followers using the third set of rules by:
   generating a list of candidates that have ratings on the online service above a threshold and that have approved that their profiles to appear on the online service for follow suggestions;
   generating fit levels for the candidates, wherein the fit levels include a demographic fit level, a psychological fit level, and a rating of each candidate on the online service;
   generating a match score for each candidate based on the fit levels; and
   suggesting the followers by selecting some of the candidates based on their match scores and gender.

7. The system of claim 6 wherein the instructions further configure the processor to:
   generate the demographic fit level of a candidate based on a relationship of age and location of the candidate relative to the user; and
   generate the psychological fit level of a candidate based on a relationship of a happiness score and track recommendations for the candidate relative to the user.

8. The system of claim 6 wherein the instructions further configure the processor to generate the match score for a candidate by adding one third of each of the demographic fit level, the psychological fit level, and the rating of the candidate.

9. The system of claim 1 wherein each of the skills includes skill categories, and the instructions further configure the processor to:
   present to the user a set of questions for assessing affinity and mastery of the user in each of the skill categories;
   receive answers from the user to the set of questions;
   generate, based on the answers, an assessment for the user for each of the skills, wherein the assessment includes an affinity assessment and a mastery assessment for each of the skill categories;
   generate an affinity profile of the user for each of the skills, wherein the affinity profile includes a list of the skill categories in decreasing order of average score of the answers, and wherein higher average score in a skill category indicates higher affinity for that skill category; and
   generate a mastery profile of the user for each of the skills, wherein the mastery profile includes a list of the skill categories in decreasing order of average score of the answers, and wherein higher average score in a skill category indicates higher mastery for that skill category.

10. The system of claim 9 wherein the instructions further configure the processor to:
    identify and indicate to the user some of the skill categories in which the user has high affinity and high mastery, wherein the user benefits from increasing awareness and using the identified categories; and
    identify and indicate to the user some of the skill categories in which the user has high affinity and low mastery, wherein the user benefits from engaging in and building skill level in the identified categories.

11. The system of claim 1 wherein the instructions further configure the processor to:
    present to the user questions for assessing strength of the user in a plurality of character traits including emotional, intellectual, interpersonal, restraint, and future orientation;
    receive answers from the user to the questions; and
    indicate dominant character trait or traits of the user based on the answers.

12. The system of claim 1 wherein the instructions further configure the processor to generate the tracks including the activities for a plurality of life domains including career and money, family and children, leisure and fun, love and intimacy, and mind and body.

13. The system of claim 1 wherein the instructions further configure the processor to:
    receive, from the user, a completed subset of activities of a track in a limited time period and provide rewards to the users based on the number of activities completed in the limited time period, wherein a reward for a subset represents a level of activity of the user in the subset;
    receive from the user a request to extend the limited time period and yet provide the rewards; and
    receive from the user a request to skip some of the activities in one subset and move to a next subset and yet provide some of the rewards.

14. The system of claim 1 wherein the instructions further configure the processor to:
    provide each subset including an initial portion, a middle portion, and an end portion;
    provide the initial portion including activities to motivate the user;
    provide the middle portion including activities to build on or complement the initial portion; and
    provide the end portion including activities to lead the user to a next subset of the track.

15. The system of claim 1 wherein the instructions further configure the processor to:
    provide each activity in a track including tasks that are consistent with a theme of the track;
    provide with each task a scientific reference and an explanation of usefulness and relationship of the task to the happiness of the user;
    receive, from the user, a selection of one of the tasks; and
    provide the user a credit for the activity in response to the user completing the selected task.

16. The system of claim 1 wherein the activities include one or more of:
    reflecting on a topic and writing about the topic in a blog;
    performing a real life activity and writing about the experience of performing the real life activity;
    answering multiple choice questions;
    polling an opinion of the user about a topic and showing the user a breakdown of votes of other users; and training the user on a skill by playing a game.

17. The system of claim 1 wherein the instructions further configure the processor to provide to the user several alternatives to complete each activity by providing suggested tasks for the user to select from.

18. The system of claim 1 wherein the number of activities per subset of a track is configurable.

19. The system of claim 1 wherein the activities include:
a first type of activities including games, quizzes, activity quizzes, and opinion polls; and
a second type of activities including writing a blog by reflecting on a topic, and planning and performing an activity in real world and providing a report thereon.

20. The system of claim 1 wherein the instructions further configure the processor to:
offer the user a personalized daily activity when the user is not in a track; or
receive, from the user, a selection of an available activity from a skill menu.

21. The system of claim 1 wherein the instructions further configure the processor to:
build a list of people having maximum impact on the happiness of the user; and
direct the user to perform some of the activities with the people in the list, wherein the activities include sharing posts and experiences with each other.

22. The system of claim 1 wherein the instructions further configure the processor to:
obtain information about the user using a happiness compass of the user, which is an array of implicit user inputs regarding personal data of the user; and
recommend activities for the user based on the information.

23. The system of claim 22 wherein the personal data includes demographic data, social activity data, spending data, data regarding connectivity to social networks and communications, and biometric data.

24. The system of claim 1 wherein the skills include savor, thank, aspire, give, and empathy.

25. A system for providing an online service and social community for engaging, learning, and training skills for happiness, the system comprising:
a processor; and
memory storing instructions which when executed by the processor configure the processor to:
provide the online service via a network to a plurality of computing devices used by users to interact with the online service via the network;
provide a plurality of tracks, wherein each track includes a set of activities, and wherein:
the activities are programmed to address a specific goal,
the activities are arranged in subsets such that the number and difficulty level of activities increase as the users progress through the subsets,
the activities are gradually made available to the users based on progress made by the users in building their skills, and
the activities include links to studies about the activities directly accessible by the users;
provide an initial happiness score and a track from the plurality of tracks to a user based on a self-assessment completed by the user upon signing up for the online service;
monitor progress of the user based on self-assessments periodically completed by the user as the user performs the activities in the track, wherein each self-assessment includes a happiness score determined by:
presenting a plurality of questions to the user;
receiving answers to the questions from the user;
generating a positive emotion score ("PES") based on a first combination of a first plurality of the answers, including, $$PES = \frac{(q1 + q2 + (6 - q3) + (6 - q4) - 4)}{16} \times 100;$$

generating a life satisfaction score ("LSS") based on a second combination of a second plurality of the answers, including $$LSS = \frac{(q5 + q6 + q7 + q8 + q9 - 5)}{30} \times 100;$$

and generating the happiness score ("HS") based on the positive emotion score and the life satisfaction score, including $$HS = \frac{(PES + LSS)}{2};$$

and modify the track based on the self-assessments;
suggest followers to the user from the users whose profiles match the profile of the user in terms of demographics, psychographics, and level of activity of the users on the online service using a set of rules, wherein the followers and the user share posts and socialize around shared contextual activity posts; and
generate a happiness graph for the user that correlates the activities and the followers with their impact on the happiness score of the user, wherein the online service optimizes the activities based on the happiness graph, and data received from a plurality of input sensors, the data including at least location, calendar, purchase preferences, and heartbeat data.

26. A system for providing an online service and social community for engaging, learning, and training skills for happiness, the system comprising:
a processor; and
memory storing instructions which when executed by the processor configure the processor to:
provide the online service via a network to a plurality of computing devices used by users to interact with the online service via the network;
provide a plurality of tracks, wherein each track includes a set of activities, and wherein:
the activities are programmed to address a specific goal,
the activities are arranged in subsets such that the number and difficulty level of activities increase as the users progress through the subsets,
the activities are gradually made available to the users based on progress made by the users in building their skills, and the activities include links to studies about the activities directly accessible by the users;
provide an initial happiness score and a track from the plurality of tracks to a user based on a self-assessment completed by the user upon signing up for the online service, the happiness score determined by:
presenting a plurality of questions to the user;
receiving answers to the questions from the user;
generating a positive emotion score ("PES") based on a first combination of a first plurality of the answers, including, $$PES = \frac{(q1 + q2 + (6 - q3) + (6 - q4) - 4)}{16} \times 100;$$

generating a life satisfaction score ("LSS") based on a second combination of a second plurality of the answers, including $$LSS = \frac{(q5 + q6 + q7 + q8 + q9 - 5)}{30} \times 100;$$

and
generating the happiness score ("HS") based on the positive emotion score and the life satisfaction score, including $$HS = \frac{(PES + LSS)}{2};$$

monitor progress of the user based on self-assessments periodically completed by the user as the user performs the activities in the track, wherein each self-assessment includes a recommended track selected for the user by:
presenting a plurality of questions to the user, wherein for each question, a first weight is assigned to each track;
receiving answers to the questions from the user, wherein an answer for each question is selected from a plurality of choices, and wherein each choice is assigned a second weight;
generating a score for each track by taking products of the second weights of the choices selected by the user in the answers to the questions and the first weights assigned to the track for the questions, and by adding the products;
modify the track based on the self-assessments;
generate a happiness graph for the user that correlates the activities and followers with their impact on the happiness score of the user, wherein the online service optimizes the activities based on the happiness graph, and data received from a plurality of input sensors, the data including at least location, calendar, purchase preferences, and heartbeat data.

27. A system for providing an online service and social community for engaging, learning, and training skills for happiness, the system comprising:
a processor; and
memory storing instructions which when executed by the processor configure the processor to:
provide the online service via a network to a plurality of computing devices used by users to interact with the online service via the network;
provide a plurality of tracks, wherein each track includes a set of activities, and wherein:
the activities are programmed to address a specific goal, the activities are arranged in subsets such that the number and difficulty level of activities increase as the users progress through the subsets,
the activities are gradually made available to the users based on progress made by the users in building their skills, and
the activities include links to studies about the activities directly accessible by the users;
provide an initial happiness score to the user based on a self-assessment completed by the user upon signing up for the online service, the happiness score determined by:
presenting a plurality of questions to the user;
receiving answers to the questions from the user;
generating a positive emotion score ("PES") based on a first combination) of a first plurality of the answers, including, $$PES = \frac{(q1 + q2 + (6 - q3) + (6 - q4) - 4)}{16} \times 100;$$

generating a life satisfaction score ("LSS") based on a second combination of a second plurality of the answers, including $$LSS = \frac{(q5 + q6 + q7 + q8 + q9 - 5)}{30} \times 100;$$

and
generating the happiness score ("HS") based on the positive emotion score and the life satisfaction score, including $$HS = \frac{(PES + LSS)}{2};$$

present a plurality of questions to a user, wherein for each question, a first weight is assigned to each track;
receive answers to the questions from the user, wherein an answer for each question is selected from a plurality of choices, and wherein each choice is assigned a second weight;
generate a score for each track by taking products of the second weights of the choices selected by the user in the answers to the questions and the first weights assigned to the track for the questions, and by adding the products;
select the track with the highest score as a recommended track;
generate a happiness graph for the user that correlates the activities and followers with their impact on the happiness score of the user, wherein the online service optimizes the activities based on the happiness graph, and data received from a plurality of input sensors, the data including at least location, calendar, purchase preferences, and heartbeat data.

28. A system for providing an online service and social community for engaging, learning, and training skills for happiness, the system comprising:

a processor; and
memory storing instructions which when executed by the processor configure the processor to:
provide the online service via a network to a plurality of computing devices used by users to interact with the online service via the network;
provide a plurality of tracks, wherein each track includes a set of activities, and wherein:
the activities are programmed to address a specific goal,
the activities are arranged in subsets such that the number and difficulty level of activities increase as the users progress through the subsets,
the activities are gradually made available to the users based on progress made by the users in building their skills, and
the activities include links to studies about the activities directly accessible by the users;
wherein each of the skills includes skill categories, and the instructions further configure the processor to perform a skill assessment of a user by:
presenting to a user a set of questions for assessing affinity and mastery of the user in each of the skill categories;
receiving answers from the user to the set of questions;
generating, based on the answers, an assessment for the user for each of the skills, wherein the assessment includes an affinity assessment and a mastery assessment for each of the skill categories;
generating an affinity profile of the user for each of the skills, wherein the affinity profile includes a list of the skill categories in decreasing order of average score of the answers, and wherein higher average score in a skill category indicates higher affinity for that skill category;
generating a mastery profile of the user for each of the skills, wherein the mastery profile includes a list of the skill categories in decreasing order of average score of the answers, and wherein higher average score in a skill category indicates higher mastery for that skill category;
identify and indicate to the user some of the skill categories in which the user has high affinity and high mastery;
identify and indicate to the user some of the skill categories in which the user has high affinity and low mastery;
recommending a track from the plurality of tracks to the user based on the skill assessment;
provide an initial happiness score to the user based on a self-assessment completed by the user upon signing up for the online service, the happiness score determined by:
presenting a plurality of questions to the user;
receiving answers to the questions from the user;
generating a positive emotion score ("PES") based on a first combination of a first plurality of the answers, including, $$PES = \frac{(q1 + q2 + (6 - q3) + (6 - q4) - 4)}{16} \times 100;$$

generating a life satisfaction score ("LSS") based on a second combination of a second plurality of the answers, including $$LSS = \frac{(q5 + q6 + q7 + q8 + q9 - 5)}{30} \times 100;$$

and generating the happiness score ("HS") based on the positive emotion score and the life satisfaction score, including $$HS = \frac{(PES + LSS)}{2};$$

generate a happiness graph for the user that correlates the activities and followers with their impact on the happiness score of the user, wherein the online service optimizes the activities based on the happiness graph, and data received from a plurality of input sensors, the data including at least location, calendar, purchase preferences, and heartbeat data.

29. A system for providing an online service and social community for engaging, learning, and training skills for happiness, the system comprising:
a processor; and
memory storing instructions which when executed by the processor configure the processor to:
provide the online service via a network to a plurality of computing devices used by users to interact with the online service via the network;
provide a plurality of tracks, wherein each track includes a set of activities, and wherein:
the activities are programmed to address a specific goal,
the activities are arranged in subsets such that the number and difficulty level of activities increase as the users progress through the subsets,
the activities are gradually made available to the users based on progress made by the users in building their skills, and
the activities include links to studies about the activities directly accessible by the users;
provide an initial happiness score to the user based on a self-assessment completed by the user upon signing up for the online service, the happiness score determined by:
presenting a plurality of questions to the user;
receiving answers to the questions from the user;
generating a positive emotion score ("PES") based on a first combination of a first plurality of the answers, including, $$PES = \frac{(q1 + q2 + (6 - q3) + (6 - q4) - 4)}{16} \times 100;$$

generating a life satisfaction score ("LSS") based on a second combination of a second plurality of the answers, including $$LSS = \frac{(q5 + q6 + q7 + q8 + q9 - 5)}{30} \times 100;$$

and
generating the happiness score ("HS") based on the positive emotion score and the life satisfaction score, including $$HS = \frac{(PES + LSS)}{2};$$

present to a user questions for assessing strengths of the user in a plurality of character traits including emotional, intellectual, interpersonal, restraint, and future orientation;
receive answers from the user to the questions;
indicate dominant character trait or traits of the user based on the answers; and
recommend a track from the plurality of tracks to the user based on the strengths; and
generate a happiness graph for the user that correlates the activities and followers with their impact on the happiness score of the user, wherein the online service optimizes the activities based on the happiness graph, and data received from a plurality of input sensors, the data including at least location, calendar, purchase preferences, and heartbeat data.

* * * * *